US008554075B2

(12) United States Patent
Mizutani et al.

(10) Patent No.: US 8,554,075 B2
(45) Date of Patent: Oct. 8, 2013

(54) COMMUNICATION SYSTEM, SUBSCRIBER ACCOMMODATING APPARATUS AND COMMUNICATION METHOD

(75) Inventors: Masahiko Mizutani, Fujisawa (JP); Yusuke Yajima, Fujisawa (JP); Nobuyuki Yamamoto, Yokohama (JP); Yoshihiro Ashi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 265 days.

(21) Appl. No.: 13/144,253

(22) PCT Filed: Jan. 13, 2009

(86) PCT No.: PCT/JP2009/050280
§ 371 (c)(1),
(2), (4) Date: Jul. 12, 2011

(87) PCT Pub. No.: WO2010/082290
PCT Pub. Date: Jul. 22, 2010

(65) Prior Publication Data
US 2011/0268435 A1 Nov. 3, 2011

(51) Int. Cl.
*H04J 14/00* (2006.01)
*H04J 14/02* (2006.01)
(52) U.S. Cl.
CPC .................. *H04J 14/0227* (2013.01)
USPC ..................... 398/58; 398/5; 398/8
(58) Field of Classification Search
USPC ............................. 398/1, 5, 8, 9, 58
See application file for complete search history.

(56) References Cited

U.S. PATENT DOCUMENTS

| 2002/0105691 | A1 | 8/2002 | Ichibangase et al. |
| 2008/0131124 | A1* | 6/2008 | Nam et al. ................ 398/67 |
| 2008/0232804 | A1* | 9/2008 | Absillis ..................... 398/71 |
| 2010/0098407 | A1* | 4/2010 | Goswami et al. ............ 398/5 |

FOREIGN PATENT DOCUMENTS

| JP | 11-027325 | 1/1999 |
| JP | 2000-151634 | 5/2000 |
| JP | 2001-345786 | 12/2001 |

OTHER PUBLICATIONS

Gigabit-capable Passive Optical Networks (GPON): General characteristics; Telecommunication Standardization Sector of ITU; G.984.1 (Mar. 2003); pp. i-iii and 1-14.
Gigabit-capable Passive Optical Networks (GPON): Physical Media Dependent (PMD) layer specification; Telecommunication Standardization Sector of ITU; G.984.2 (Mar. 2003); pp. i-iii and 1-29.

(Continued)

*Primary Examiner* — Dalzid Singh
(74) *Attorney, Agent, or Firm* — Foley & Lardner LLP

(57) ABSTRACT

Switching process at the occurrence of a path trouble is performed more quickly to reduce the number of packet discards during a traffic transition from a currently used system path to a standby system path within a section to be protected. An OLT (210-W) refers to the DBA information of a PON section and, if receiving no CCM frame at a timing at which the same should be received, then determines that some trouble has occurred on the path (S801) and transmits, to an OAM-compliant NE (200-Z), an application-for-switching frame (1501) to notify the OAM-compliant NE (200-Z) of the abnormal condition. The OAM-compliant NE (200-Z) monitors the occurrence of the trouble within the PON section nearly in real time, starts a switching process (S802) and generates and transmits a standby-system delivery request (321) (S302, S803). An OAM-compliant NE (200-A) switches the communication path to the standby-system passing through an OLT (210-P).

5 Claims, 20 Drawing Sheets

(56) References Cited

OTHER PUBLICATIONS

Gigabit-capable Passive Optical Networks (G-PON): Transmission convergence layer specification; Telecommunication Standardization Sector of ITU G.984.3 (Feb. 2004); pp. i-iv and 1-107.

Part 3: Carrier Sense Multiple Access with Collision Detection (CSMA/CD) access method and Physical Layer specifications; IEEE 802.3-2008; 19 pages.

OAM functions and mechanisms for Ethernet based networks; Telecommunicaton Standardization Sector of ITU; Y.1731 (Feb. 2008); pp. i-vi and 1-72.

Ethernet linear protection switching; Telecommunication Standardization Sector of ITU; G.8031/Y.1342 (Nov. 2009); pp. i-iv and 1-71.

Characteristics of Ethernet transport network equipment functional blocks; Telecommunication Standardization Sector of ITU; G.8021/Y.1341 (Oct. 2010); pp. 1-278.

PCT International Search Report on application No. PCT/JP2009/050280 mailed Feb. 24, 2009; 11 pages.

\* cited by examiner

| 1293 | | | | |
|---|---|---|---|---|
| EXPECTED CCM FRAME ARRIVAL TIME | ARRIVAL TIME | LAG FROM EXPECTED TIME | THE OTHER CCM FRAME INFORMATION | Flags |
| 01:02:03 456 | | | | |
| 01:02:04 456 | | | | |

FIG. 17

COMMUNICATION SYSTEM, SUBSCRIBER ACCOMMODATING APPARATUS AND COMMUNICATION METHOD

TECHNICAL FIELD

The present invention relates to a communication system and a communication apparatus, and more particularly to a communication system and a communication apparatus which reduce a communication stop time occurring during operation of switching between a working communication path and a protection communication path to improve availability of the communication system and the communication apparatus.

BACKGROUND ART

In general, with an increasing demand for a broadband, as user access lines, implementation of large-capacity access lines has been advanced instead of a communication technology based on a telephone line such as a digital subscriber line (DSL). At present, in the optical access lines, a passive optical network (PON) system that can share optical fibers with plural subscribers has been frequently used from line construction costs and maintenance management costs. The PON system that multiplexes traffics flowing between a plurality of users and a station so that a connection status and a bandwidth usage situation can be intensively managed at the station side is one of major technologies in the future subscriber line service.

In the International Telecommunication Union Telecommunication Standardization Sector (ITU-T) that is one of international standardization organizations, a gigabit capable PON (G-PON) system is specified (Non Patent Literatures 1 to 3). In 2006, a large number of vendors have started to supply G-PON products to the market, and at the same time, carriers in the respective countries have started optical access services employing the G-PON. Also, parts of the carriers are providing the optical access services employing a gigabit Ethernet (registered trademark) PON (GE-PON) (Non Patent Literature 4) specified by the Institute of Electrical and Electronics Engineers, Inc. (IEEE) which is another international standardization organization.

In the transmission network, a study has been made to shift from the existing synchronous optical network (SONET)/synchronous digital hierarchy (SDH) technology and the asynchronous transfer mode (ATM) technology to a packet communication technology such as the Ethernet and multiprotocol label switching (MPLS). In the packet communication network, a packet format is configured by a header and a payload, and a relay unit conducts processing for each packet on the basis of a destination ID and a source ID included in a header part as well as associated control information. In this case, a communication configuration is not of a system that transmits and receives a signal with the aid of a statically set path such as the existing synchronous network or ATM network, but of a communication system different in the communication path for each packet. When attention is paid to a part of the paths, a series of packets having the same header information do not occupy the path, but plural packets having the respective different header information exist on the path at the same time.

At present, the communication network is becoming essential as the society's infrastructure. With wide spread of the communication network, a demand has been made to reduce the price of the communication servicer. It would be substantially obvious that this tendency leads to such an idea that the infrastructure is configured by the combination of the optical access network and the packet communication network. On the other hand, high stability is required to provide the infrastructure. The development of the maintenance and management function for improving the stability causes an increase in the costs.

As one method for satisfying conflicting requirements such as realization for the low price and the securement for the high stability, a method has been studied in which in order to artificially maintain and manage the path in the packet communication, a virtual local area network (VLAN) in the Ethernet and a label switched path (LSP) in the MPLS are set to manage the connection. Such an idea that the path is artificially set on the packet communication network, and the path is maintained and managed is useful in coexistence with the existing network and shift from the existing network. As a typical example thereof, there is an Ethernet operations, administration and maintenance (OAM) technology (Non Patent Literature 5). Further, a protection switching technology based on the Ethernet OAM (Non Patent Literature 6) is standardized.

Non Patent Literature1: ITU-T Recommendation G.984.1, "Gigabit-capable Passive Optical Networks(G-PON): General Characteristics"

Non Patent Literature2: ITU-T Recommendation G.984.2, "Gigabit-capable Passive Optical Networks (G-PON): Physical Media Dependent (PMD) Layer Specification"

Non Patent Literature3: ITU-T Recommendation G.984.3, "Gigabit-capable Passive Optical Networks (G-PON): Transmission convergence Layer Specification"

Non Patent Literature4: IEEE 802.3-2005, "IEEE Standard for Information Technology-Telecommunications and Information exchange between Systems-Local and Metropolitan Area Networks—Specific Requirements Part 3: Carrier Sense Multiple Access With Collision Detection (CSMA/CD) Access Method and Physical Layer Specifications"

Non patent Literature5: ITU-T Recommendation Y.1731, "OAM Functions and Mechanisms for Ethernet based Networks"

Non Patent literature6: ITU-T Recommendation G.8031/Y.1342, "Ethernet Protection Switching"

Non Patent Literature7: ITU-T Recommendation G.8021, "Characteristics of Ethernet transport network equipment functional blocks"

DISCLOSURE OF THE INVENTION

Technical Solution

At present, the packet communication network can freely change a network configuration by autonomously operating the respective devices. On the other hand, the packet communication network is inferior in the stability of the path to the synchronous communication network. The communication network as the society's infrastructure is required to flexibly address a fault resistance. On the other hand, the communication network is required to enable a path setting for maintenance and management by the telecommunications carriers, and also to stabilize (continue) the operation till an instant that a failure occurs. Those requirements normally conflict with each other.

In the conventional synchronous communication network, information flowing on the path is phone speech data and web data small in data size, and traffic flowing over the entire network is small. Also, if the speech data can be completely switched in a short time (for example, about 50 msec), a user does not need to recognize the path failure.

At present, a rate of video data is increased instead of speech, and disturbance of received information can be recognized by a user in real time with development of higher image quality. Also, data size downloaded from the web is large, and the line bandwidth is widened, resulting in a situation where a failure of partial packet transmission enlarges a transmission time, which can be also sensuously recognized by the user.

During operation of switching from a working communication path to a protection communication path in the packet communication network, a given time is required for analyzing a maintenance and management packet (OAM packet) for confirmation. When a communication failure occurs in a path being used, no path temporarily exists in a time required for the control packet analysis and the path switching process, resulting in a possibility that parts of the packet are discarded.

Also, in implementation of protection switching in an access interval redundant configuration having the PON included in the transmission path, when a protection interval is relatively long, a given time is required for analyzing a control packet (OAM packet) that passes through the path in order to confirm the path situation according to the characteristic of the switching mechanism of the packet transmission network (for example, Ethernet (registered trademark)) OAM. For that reason, there is a tendency that a processing time since a communication failure in one path is detected until the path switching is completed becomes longer according to the distance. Because the protection interval is in a communication stop state within the switching process time, there is a possibility that the packets transmitted since a failure occurrence time till a switching completion time are discarded in the above interval.

From the above consideration, there is a need to increase a path switching speed at the time of switching the path from a working system to a protection system, and the vice versa in the packet communication network, or to suppress the packet discard.

The present invention has been made in view of the above viewpoint, and aims at increasing a switching speed of the working system and the protection system in the packet communication network in order to reduce a packet loss at the time of switching the path in the packet relay network.

Solution to Problem

According to the present invention, the PON is used for at least one of the working system and the protection system whereby a communication management system in the PON interval is utilized to rapidly detect a communication defect in the path including the PON. The failure detection in the PON interval can employ determination of a burst reception timing based on, for example, a dynamic bandwidth assignment (DBA) information. Because the switching process can start in earlier timing than that of a normal packet communication network, the number of packets transmitted in a path where a failure occurs, that is, the number of packets discarded on the path can be reduced.

A reciprocating communication time in the PON interval can be acquired from ranging information managed by an optical line terminal (OLT). Referring to the communication time, a packet retention (delay) time since a user frame is received until the user frame is transmitted can be set in an optical network unit (ONU) or an edge device as a start point of the protection interval. When an optical access (PON) interval is a main protection interval, a packet retention (delay) time in the edge device, which is most suitable for each redundant system, can be set according to the ranging information in the PON interval (a minimum retention time can be specified). In the normal packet network, it is difficult to set such a standby time. With setting of the retention time, the packets can seamlessly continue to be transferred to the user without affecting by the switching process.

According to the first solving means of the present invention, there is provided a communication system, comprising:

a first passive optical network including one or more first subscriber devices, and a first subscriber accommodating device that can connect the one or more subscriber devices in time division multiplexing;

a second passive optical network including one or more second subscriber devices, and a second subscriber accommodating device that can connect the one or more second subscriber devices in time division multiplexing; and a first communication device and a second communication device which are connected by a first communication path on the first passive optical network and a second communication path on the second passive optical network, at least one of the first communication device and the second communication device has a function of selecting any one of the first and second communication paths to be used, wherein the first subscriber accommodating device stores operations, administrations and maintenance (OAM) information that predetermines reception intervals of monitoring frames for monitoring a path status, which are periodically transmitted from the first communication device at a transmitter side, during communication between the first communication device and the second communication device through the first communication path on the first passive optical network, the first subscriber accommodating device configuring a working path determines whether a frame received from one of the first subscriber devices is the monitoring frame, or not, and if the frame is the monitoring frame, the first subscriber accommodating device checks the monitoring frame against the OAM information, and confirms whether the monitoring frame can be received in regular timing, or not, if the first subscriber accommodating device can confirm that the monitoring frame is received in the regular timing, the first subscriber accommodating device transfers the frame to the second communication device that is a destination device, if the first subscriber accommodating device cannot confirm that the monitoring frame is received in the regular timing, the first subscriber accommodating device extracts path identification information configured by the first subscriber device that detects failure from the received frame, generates a path switching application frame including the path identification information and a flag indicative of the failure, and transfers the path switching application frame to the second communication device, and the second communication device includes a communication status management database storing path use information indicative of a communication path used for each of an upstream communication and a downstream communication for each path identification information, wherein, when the second communication device receives the path switching application frame from the first subscriber accommodating device that configures the working path, the second communication device determines that a failure occurs in the path, and extracts the path identification information from the received switching application frame, the second communication device records, in the communication state management database, the path use information in which the failure detected path specified by the path identification information is set to off, and the path to be used after switching is set to on, the second communication device generates a protection delivery request frame including the path identification information and the path use information, and transmits the protection delivery request frame to the second subscriber accommodating device, and wherein the second subscriber accommodating device transfers the protection delivery request frame received from the second communication device to the first communication device, and wherein, upon receiving the protection delivery request frame, the first communication device changes the communication path toward the second communication device from the first passive optical network to the second passive optical network.

According to the second solving means of the present invention, there is provided a subscriber accommodation apparatus in a communication system, comprising:

a first passive optical network including one or more first subscriber devices, and a first subscriber accommodating device that can connect the one or more subscriber devices in time division multiplexing;

a second passive optical network including one or more second subscriber devices, and a second subscriber accommodating device that can connect the one or more second subscriber devices in time division multiplexing; and a first communication device and a second communication device which are connected by a first communication path on the first passive optical network and a second communication path on the second passive optical network, at least one of the first communication device and the second communication device has a function of selecting any one of the first and second communication paths to be used, wherein the first subscriber accommodating device stores operations, administrations and maintenance (OAM) information that predetermines reception intervals of monitoring frames for monitoring a path status, which are periodically transmitted from the first communication device at a transmitter side, during communication between the first communication device and the second communication device through the first communication path on the first passive optical network, the first subscriber accommodating device configuring a working path determines whether a frame received from one of the first subscriber devices is the monitoring frame, or not, and if the frame is the monitoring frame, the first subscriber accommodating device checks the monitoring frame against the OAM information, and confirms whether the monitoring frame can be received in regular timing, or not, if the first subscriber accommodating device can confirm that the monitoring frame is received in the regular timing, the first subscriber accommodating device transfers the frame to the second communication device that is a destination device, if the first subscriber accommodating device cannot confirm that the monitoring frame is received in the regular timing, the first subscriber accommodating device extracts path identification information configured by the first subscriber device that detects failure from the received frame, generates a path switching application frame including the path identification information and a flag indicative of the failure, and transfers the path switching application frame to the second communication device, and wherein, when the second communication device receives the path switching application frame from the first subscriber accommodating device that configures the working path, the second communication device determines that a failure occurs in the path, and execute path switching process to the second communication device.

According to the third solving means of the present invention, there is provided a communication method using a communication system, comprising:

a first passive optical network including one or more first subscriber devices, and a first subscriber accommodating device that can connect the one or more subscriber devices in time division multiplexing;

a second passive optical network including one or more second subscriber devices, and a second subscriber accommodating device that can connect the one or more second subscriber devices in time division multiplexing; and a first communication device and a second communication device which are connected by a first communication path on the first passive optical network and a second communication path on the second passive optical network, at least one of the first communication device and the second communication device has a function of selecting any one of the first and second communication paths to be used, wherein the first subscriber accommodating device stores operations, administrations and maintenance (0AM) information that predetermines reception intervals of monitoring frames for monitoring a path status, which are periodically transmitted from the first communication device at a transmitter side, during communication between the first communication device and the second communication device through the first communication path on the first passive optical network, the first subscriber accommodating device configuring a working path determines whether a frame received from one of the first subscriber devices is the monitoring frame, or not, and if the frame is the monitoring frame, the first subscriber accommodating device checks the monitoring frame against the OAM information, and confirms whether the monitoring frame can be received in regular timing, or not, if the first subscriber accommodating device can confirm that the monitoring frame is received in the regular timing, the first subscriber accommodating device transfers the frame to the second communication device that is a destination device, if the first subscriber accommodating device cannot confirm that the monitoring frame is received in the regular timing, the first subscriber accommodating device extracts path identification information configured by the first subscriber device that detects failure from the received frame, generates a path switching application frame including the path identification information and a flag indicative of the failure, and transfers the path switching application frame to the second communication device, and the second communication device includes a communication status management database storing path use information indicative of a communication path used for each of an upstream communication and a downstream communication for each path identification information, wherein, when the second communication device receives the path switching application frame from the first subscriber accommodating device that configures the working path, the second communication device determines that a failure occurs in the path, and extracts the path identification information from the received switching application frame, the second communication device records, in the communication state management database, the path use information in which the failure detected path specified by the path identification information is set to off, and the path to be used after switching is set to on, the second communication device generates a protection delivery request frame including the path identification information and the path use information, and transmits the protection delivery request frame to the second subscriber accommodating device, and wherein the second subscriber accommodating device transfers the protection delivery request frame received from the second communication device to the first communication device, and wherein, upon receiving the protection delivery request frame, the first communication device changes the communication path toward the second communication device from the first passive optical network to the second passive optical network.

Advantageous Effects of Invention

According to the present invention, because the packet loss during the path switching operation in the packet relay network is reduced, a switching time of the working system and the protection system in the packet communication network can be shortened to reduce the packet loss that may occur during the switching process.

BRIEF DESCRIPTION OF THE DRAWINGS

FIG. 17 illustrates a configuration example of a CCDB 1293 provided in the OAM-capable NE 200-Z.

DESCRIPTION OF EMBODIMENTS

1. Outline

Figure 1:
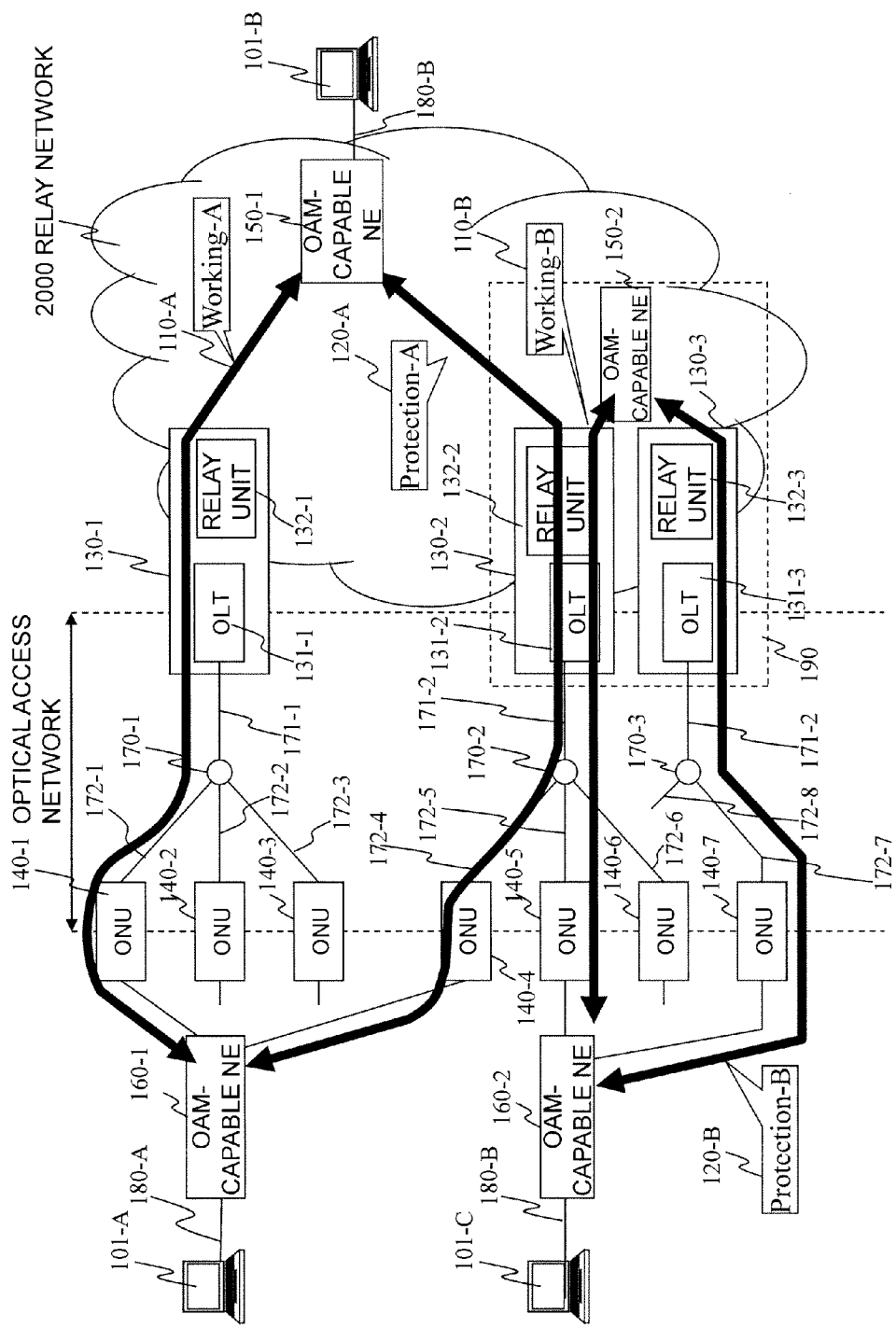
FIG. 1 illustrates a basic communication system configuration diagram when an optical access network is included in a protection interval.

As described in Technical Solution, in order to prevent data transmitted or received before and after the path switching operation from being lost, or an influence on applications utilized by a user, it is desirable to shorten a time difference required for packet transmission between a working path and a protection path.

Under the circumstances, let us consider a redundant system using an optical access (PON) device in a part of a packet relay network as an example. When a required communication time is different between a working path and a protection path, the required communication time in the redundant access line can be adjusted to be identical between both of those paths by using a logical distance adjusting function (ranging function) of a PON. In fact, it is normal that if the path is different in the packet communication network, the number of relay nodes through which each path goes up to a destination is different. When the access network redundancy introducing a PON is conducted, a difference in the communication time can be absorbed.

In order to provide a network redundancy by combination of an optical access network PON with an Ethernet OAM device, plural configuring methods are proposed. As typical methods, there are a method of providing redundancy for an optical fiber configured in a PON interval to prepare for a failure (disclosed in Non Patent Literature 1), and an optical access network redundant configuration using plural PON systems for a working system and a protection system, for example. A communication in the PON interval is disabled with respect to all of plural subscribers when a trunk fiber (optical fiber connected to an OLT side, through which multiplexed data passes) is disconnected. Under the circumstances, the latter network redundant configuration more ensures service continuity of carriers.

As specific means, a communication time measurement frame is sent to both paths of a working system and a protection system from a transmitter OAM-capable device at the same time. Reception times of the frame arriving from both of those paths are confirmed, and a time difference between both of those paths is measured in a receiver OAM-capable device. This time difference is fed back to a logical distance adjusting function in the PON interval to determine a required communication time in the PON interval included in each of the working system and the protection system.

In the receiver OAM-capable device, it may be determined whether the frame is normally received, or not, with reference to the reception times of the frame from both of those paths and the frame information, the communication state of each path may be confirmed, and a transfer performance of each path may be monitored in real time.

The communication function of the PON facilitates a process of increasing a failure detection speed on the path. With use of a bandwidth control function in an OLT, at the time of switching the path from the working system to the protection system and vice versa, a period during which the path extending from the transmitter OAM-capable device to the receiver OAM-capable device is lost can be shortened to reduce an influence (that is, a communication stop time) on the user during the path switching operation.

Similarly, this system is applicable to a case in which the PON is included in only one path, if a communication time in the path including the PON interval is shorter than that in the other path.

In this embodiment, in the following description, a case in which the PON is included in each of those paths is assumed as one example.

2. Basic System Configuration

FIG. 1 illustrates a basic communication system configuration diagram when an optical access network is included in a protection interval.

In FIG. 1, two pairs of communication paths each having a working path (working) and a protection path (protection) are expressed. The pair of a working-A (110-A) and a protection-A (120-A) is a communication path (hereinafter referred to as "communication path A" as a whole) including an optical access network and a packet communication network (relay network) 2000, and the pair of a working-B (110-B) and a protection-B (120-B) is a communication path (hereinafter referred to as "communication path B" as a whole) including an optical access network as a main protection interval.

This system includes transmission devices 130-1 to 130-3 (referred to as "OLT 130" as a whole) located in a subscriber accommodation station of a telecommunications carrier, ONUs 140-1 to 140-7 (referred to as "ONU 140" as a whole) located on user sites such as homes or corporate sites, OAM-capable NEs (network elements) 150-1, 160-1, 160-2 that are devices for conducting maintenance and management in an interval including those components, and user terminals 101-A to 101-C connected to the OAM-capable NEs. Communication paths 180-A to 180-C extending from the OAM-capable NEs to the user terminals may be formed of domestic or intranet LANs, or networks connected to web servers possessed by providers. The connections of the communication paths 180-A to 180-C may be wireless or wire, or a difference of the network scales are irrelevant directly to the essence of the present invention. Therefore, there is no object in the features of the individual networks.

Each of OLTs 131-1 to 131-3 includes a PON interface (not shown), and the plural ONUs 140 can be connected to each of the OLTs 131-1 to 131-3. The connection with the ONU 140 uses an optical fiber. The OLT 131-1 is connected to a power splitter 170-1 through an optical fiber 171-1. The power splitter 170-1 is further connected to plural optical fibers 171-1 to 171-3, and the respective optical fibers are connected to the ONUs 140-1 to 140-3. In the following description, the optical fiber 171-1 at the OLT 131-1 side with respect to the power splitter 170-1 is called "trunk fiber (basic fiber), and the optical fibers 171-1 to 171-3 at the ONU 140-1 side are called "branch fibers". Likewise, the OLT 131-2 is connected to the ONUs 140-4 to 140-6 through a power splitter 170-2, and the OLT 131-3 is connected with the ONU 140-7 through a power splitter 170-3. When the respective OLTs 131-1 to 131-3 are connected with the ONUs 140-1 to 140-7 thereunder, the ONU 140 starts up, and an up bandwidth control is conducted by the DBA during communication, and an ONU state is managed by the aid of an ONU management and control interface (OMCI).

Communications between the OLTs 131-1 to 131-3 and the ONU 140 are conducted by optical signals. Signals transmitted from the OLTs 130 toward the ONUs 140 (hereinafter referred to as "downstream signals") are split by the power splitters 170-1 to 170-3, and arrive at the ONUs 140. Each of the ONUs 140 receives the frame addressed to its own device, and discards other frames. On the other hand, signals transmitted from the ONUs 140 toward the OLTs 130 (hereinafter referred to as "upstream signals") are transmitted from the individual ONUs 140-1 to 140-7 in timing according to a transmission instruction given from the OLTs 130 to the ONUs 140 by the DBAs. The upstream signals are scheduled by the DBA function of the OLTs 130 in advance so that signals from the ONUs 140 do not overlap (can be communicated in time-division multiplex) with each other on the basic fibers 171-1 to 171-3.

The communication path A is set in an interval sandwiched between the OAM-capable NE 150-1 and the OAM-capable NE 160-1. The OAM-capable NE 150-1 is located in an edge of a relay network 2000 that is a packet communication network, and accommodates the user terminal 101-B. The OAM-capable NE 150-1 is connected to relay units 132-1 and 132-2 located in an opposite edge of the relay network 2000. The relay units 132-1 and 132-2 each function as an interface that connects the PON interval and the packet communication network. The OLTs 131-1, 131-2 and the relay units 132-1, 132-2 are integrated into a single housing or board, and implemented in a single device configuration in many cases. In this example, there is no object in the implementation configuration. For example, a configuration in which the relay unit 132-1 has plural ports, and a large-capacity switch can be connected to the plural OLTs 130 thereunder is proposed.

One OAM-capable NE 160-1 is connected to the ONUs 140-1 and 140-4. In FIG. 1, it is assumed that each of the ONUs 140-1 and 140-4 has a basic conversion function of a PON port and an electric signal. Alternatively, like the relay units 132-1 and 132-2 at the OLT 130 side, a switch function for the packet communication can be provided in the ONUs 140-1 and 140-4.

The communication path A uses the working-A path 110-A during a normal communication, and when some failure occurs in the working-A (110-A), the communication path A switches to the protection-A path 120-A to continue communication. Likewise, the communication path B uses the working-B path 110-B during a normal communication, and when some failure occurs in the working-B (110-B), the communication path B switches to the protection-B path 120-B to continue communication.

In this embodiment, application to a 1:1 protection system is assumed in the description. However, this embodiment is also applicable to a 1+1 protection system.

Also, both of the communication paths A and B enable one-way protection and two-way protection. The one-way protection is a method in which, for example, in the communication path A, a path state is diagnosed in a direction from the OAM-capable NE 150-1 to the OAM-capable NE 160-1 and in the reverse direction, separately, and the path switching operation is implemented. When a defect occurs in only one-way communication, a different path (for example, a communication from the OAM-capable NE 150-1 to the OAM-cable NE 160-1 uses the working-A (110-A) and a reverse communication uses the protection-A (120-A)) maybe used in the respective directions. A difference between one way and two ways of the applied communication configuration is irrelevant to the essence of the present invention.

Further, FIG. 1 exemplifies an appearance in which the OLTs 131-1 to 131-3 and the relay units 132-1 and 132-2 are integrated into the devices 130-1 to 130-3, respectively. A description will be made assuming that this configuration is applied to the following embodiment; however, the device configuration of the station side does not influence the essence of the present invention. For example, the OLTs 131-1 to 131-3 can provide the functions of the relay units 132-1 to 132-3, respectively. Also, the OLTs 131-2, 131-3, the relay units 132-2, 132-3, and the OAM-capable NE 150-2 can be integrated into a single housing or on an interface board of the communication device. In the latter integrated configuration, as one example, the OLTs 131-2, 131-3, the relay units 132-2 and 132-3 are inserted into the interface board slot of a device 190.

There is no object in an implementation configuration of the device 190 (within a dotted line). For example, the OLT and the OAM-capable NE may be accommodated in one device, or the OLT and the OAM-capable NE may be connected as external devices.

Figure 2:
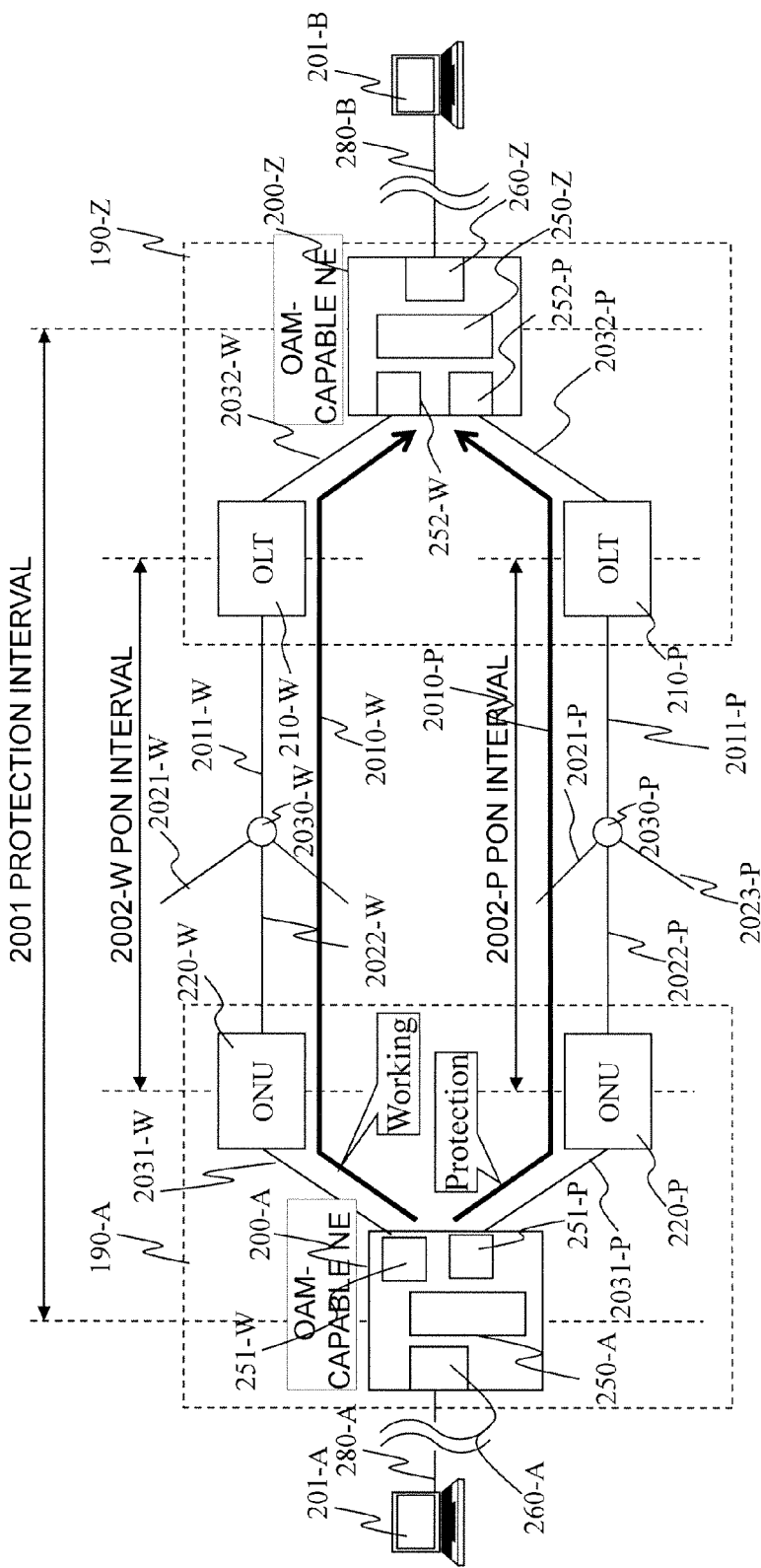
FIG. 2 illustrates a basic configuration diagram of a communication system according to an embodiment.

FIG. 2 illustrates a basic configuration diagram of a communication system according to this embodiment.

This is a diagram schematically illustrating the communication path A of FIG. 1. As a specific example, a G-PON (Non Patent Literatures 1 to 3) is assumed as the PON system. Because the same function is required when the GE-PON (Non Patent Literature 4) is applied, this case does not influence the contents of the present invention.

FIG. 2 illustrates an appearance in which a working path (working) 2010-W and a protection path (protection) 2010-P are set for an OAM-capable NE 200-A that is a transmitter node of a protection interval 2001 and an OAM-capable NE 200-Z that is a receiver node. As illustrated in FIG. 1, it is assumed that a path 2032-W that connects the OLT 210-W and the OAM-capable NE 200-Z is configured by direct coupling or plural packet relay units. Likewise, a path 2032-P is configured by plural packet relay units. The number of packet relay units configuring the path 2032-W may not be always identical with the number of packet relay units configuring the path 2032-P.

The OAM-capable NE 200-A includes a UNI side interface 260-A, a protection switch control part 250-A, an interface 251-W for the working path, and an interface 251-P for the protection path. The function block configuration of the OAM-capable NE 200-Z is the same as that of 200-A.

A PON interval 2002-W is introduced into a working path 2010-W that connects the interface 251-W for the working path and an interface 252-W. The PON interval 2002-W connects an OLT 210-W and an ONU 220-W through an optical fiber. A trunk fiber 2011-W at the OLT 210-W side and plural branch fibers 2021-W to 2023-W at the ONU 220-W side are connected to each other through a power splitter 2030-W. The working path 2010-W includes the PON interval 2002-W as well as a line 2031-W that connects the OAM-capable NE 200-A and the ONU 220-W, and a line 2032-W that connects the OLT 210-W and the OAM-capable NE 200-Z.

The OLT 210-W measures a distance (response delay time of the ONU 220-W) to the ONU 220-W in a process where the ONU 220-W starts (ranging process). The ranging process is a process necessary for discriminating an upstream signal from the ONU 220-W to the OLT 210-W at the OLT side through a time multiplexing system. The ranging process is a provision for setting a wait time (hereinafter referred to as "response time") since the individual ONUs 200-W receive a transmission instruction from the OLT 210-W until the ONU 200-W responds to the instruction, and integrating reference times (reception timing) at which the OLT 2010-W receives the upstream signals from all the ONUs 220-W for one PON system (an ONU group managed by one OLT). The OLT 210-W notifies the ONU 220-W of relative times from the reference time as a transmission start time and a transmission end time, and the ONU 220-W sends the upstream signal in timing of the instruction. For that reason, the upstream signals sent from the individual ONUs 220-W become burst signals that start to be transmitted at one time and stop to be transmitted at another time.

The PON 2002-W maintains an ONU maintenance management parameter including distance information in the PON interval so that the time multiplexing system normally operates. This operation is specified in an advice (Non Patent Literature 3), and therefore its detailed description will be omitted.

An OLT 210-P, an ONU 220-P, a power splitter 3020-P, a trunk fiber 2011-P, a branch fibers 2021-P to 2023-P, a line 2031-P, and a communication line 2032-P also have the same functions and operation as those of the working path.

A communication time between the OAM-capable NEs 200-A and 200-Z when the protection interval 2001 is used is a time obtained by adding a communication time for passing through the lines 2031-W and the 2032-W to a delay time measured by the PON 2002-W.

When the path including the PON interval is used as a redundant path, it is desirable that the communication times for the working path 2010-W and the protection path 2010-P match each other in a direction from the OAM-capable NE 200-A toward 200-Z. Likewise, in the reverse communication, it is desirable that the communication times in both of those paths are equal to each other. In the following description, in the PON intervals 2002-W and 2002-P, the ranging function of the PON is used to adjust the communication times to be identical between the working path 2010-W and the protection path 2010-P in the protection interval 2001.

For the purpose of shortening the switching time between the working path and the protection path illustrated in FIGS. 1 and 2, in this embodiment, the communication states in the working path and the protection path are grasped by using the managing function of the PON system, and the results are used. More specifically, the communication states of the OLT 210 and the ONU 220 are managed with the use of the DBA and OAM information in the PON interval 2002. When an abnormal change is observed in the communication status in the PON interval, this fact is immediately notified any one or both of the OAM-capable NEs 200-A and 200-Z to start the path switching process.

There is no object in the implementation of the device 190-A. For example, the ONU and the OAM-capable NE may be accommodated within one device, or the ONU and the OAM-capable NE may be connected as external devices. Also, there is no object in the device 190-Z. For example, the OLT and the OAM-capable NE may be accommodated in one device, or the OLT and the OAM-capable NE may be connected as external devices.

3. Operation of First Embodiment

The feature of this configuration resides in that a part of the protection interval 2001 is configured by the PON interval. Therefore, the operation of switching communication path is conducted by the aid of a fact that the reciprocating communication time in the PON interval is grasped by the OLT, which is the feature of the PON.

In the path redundant function over the existing packet communication network (for example, Non Patent Literature 6), the operation of switching to the protection system starts first after a reception failure of plural continuity check message (CCM) frames 301-1 and 301-2 (and subsequently transmitted CCM frames) has been confirmed, which is observed after the communication failure occurs. This procedure is conducted taking a fact that the packet (frame) transmission time within the packet communication network is not constant but varies with a given time width into consideration. However, when the protection interval 2001 is configured by the PON, a required reciprocating communication time in the PON interval is determined according to an equalization delay (EqD) set by the OLT when the ONU starts, and the communication traffic and the communication timing from each ONU are determined according to an instruction from the OLT. Therefore, there is no need to confirm the reception status of the plural CCM frames 301 at the frame receiver side by using the above feature, and it can be determined that a defect occurs in the path when a failure occurs in transmission or reception of one CCM frame or at an earlier stage than this failure.

First, let us consider a switching procedure when the path redundant function is used in the existing packet communication network. In the standardization technology, the frame reception status is observed by a device which is a receiving end among devices configuring the communication path to confirm the communication status of the path. That is, no condition is specified in the configuration of the path, and it is assumed that only the working communication path and the protection communication path, which extend from a transmitting end to the receiving end, are set. As one example, a condition of whether the configuration includes the PON interval, or not, is not studied as assumed in this embodiment. A specific control method of the communication path is exempt from standardization.

The switching operation of the existing packet communication network will be described in detail. When a failure occurs in the PON interval 2002 included in the working path 2010-W in the protection interval 2001 after the working system and the protection system become in the respective normal working states, the communication path is switched to the protection path.

A case in which a failure 3000 occurs in the PON interval 2002-W will be described. When the failure 3000 occurs, a frame that is going to pass through the working path 2010-W cannot arrive at the OAM-capable NE 200-Z. A path control (administration/management) frame (hereinafter referred to as "OAM frame") and a user data frame are included on a path connecting the OAM-capable NEs 200-A and 200-Z. The OAM frame is periodically sent from the transmitter OAM-capable NE 200-A for monitoring the path status. For example, FIG. 3, which will be described later, illustrates an appearance in which the OAM frame (CCM frame in this example) is periodically transmitted in a transmission period 300. There is a possibility that plural data frames are transmitted in each transmission interval 300 of the OAM frame (CCM frame). In the OAM frame (CCM frame), an OAM processing part 791 (refer to description of FIG. 8) of a receiver node (OAM-capable NE 200-Z) confirms the reception interval and the OAM frame (CCM frame) information (maintenance and management information including destination ID, source ID, and path ID). The confirmed information is used for determining whether a path through which the OAM frame (CCM frame) passes is normal, or not. The basic operation of the OAM frame (CCM frame) processing is disclosed in standardization documents including Non Patent Literature 5, and therefore its description will be omitted.

When a CCM frame transmitted from the OAM-capable NE 200-A is discarded due to a path failure, the OAM-capable NE 200-Z that is an opposing device cannot receive the frame at a scheduled arrival time T_expect. The data frame transmitted after the path failure occurs, the CCM frame transmitted in a subsequent period, and the subsequent data frame are discarded on the working path.

In the basic path switching operation in the redundant system, if the reception of a correct CCM frame cannot be confirmed while waiting for a permissible time width (hereinafter, this width is called "T_wait") from the reception failure of the CCM frame, it is determined that a failure occurs on the path. The T_wait is a determination time for presence or absence of the failure, which is specified by a system manager, a designer, or the like. In the OAM-capable NE 200-Z, when the protection interval side, that is, a packet received from the OAM 200-A is transferred to the external, the reception and transmission statuses of the packet are monitored. In one method for realizing this, IDs for identifying the received packet and the packet transmitted to the external are allocated and recorded in the interior of the device. With introduction of the IDs, even after the communication path is switched to the protection system, data duplication and defect for the user can be reduced by comparison with the ID.

The wait time T_wait is used for determination of whether there is a failure, or not, and can be set in an extremely short time depending on the system.

A factor for determining a received packet retention time (that is, a frame wait time) in the OAM-capable NE 200-Z includes setting of the packet processing time within the OAM-capable NE 200-Z including the packet ID confirmation time, that is, a packet transmission timing to a user 201-B in addition to the wait time T_wait.

Subsequent to the above processing for recording the communication path, a path switching request (data delivery request in the protection path) to the opposing OAM-capable NE 200-A is sent from the OAM-capable NE 200-Z toward the OAM-capable NE 200-A with the use of the protection path. This frame passes through the OLT 210-P and the ONU 220-P which are devices configuring the protection path and different from the working system, and notified the OAM-capable NE 200-A of. In this situation, a packet format in the PON interval can use a G-PON encapsulation method (GEM) frame, for example, in the G-PON (Non Patent Literatures 1 to 3).

Upon receiving the protection delivery request, the OAM-capable NE 200-A implements the path switching operation. After the path switching operation, the data packet is transmitted to the protection path by the OAM-capable NE 200-A.

The operation of switching between the working path and the protection path in conformity to the standards will be complemented below.

The detection of the failure possibility in the OAM-capable NE 200-Z, the communication progress record of the received frame in the OAM-capable NE 200-Z, and the delivery start request notice in the protection system at the time of detecting a failure caused by the CCM frame loss for a given time are identical with those described above.

The OAM-capable NE 200-A that receives the switching request from the OAM-capable NE 200-Z switches a transmitter selector (to be described later) so as to select the protection system, and thereafter transmits a frame received by an interface 260 and addressed to the OAM-capable NE 200-Z by the aid of the working path 2010-P. As a result, the upstream CCM frame continues to be transmitted to the respective paths of the working system and the protection system, and the upstream data frame is transmitted by the protection path 2010-P.

In the access network configuration according to this embodiment, the protection delivery request is relayed by the OLT 210-P, and further transferred to the transmitter OAM-capable NE 200-A.

In the working advice (Non Patent Literature 7), because losses of the plural CCM frames are determined as the communication failure, T_wait is set at an integral multiple of the CCM frame transmission interval determined by the system manager. Switching is not conducted without detecting the reception failure of the plural CCM frames by the OAM-capable NE 200-Z. For more clarifying the problem, a case in which the CCM frame transmission interval is large to some extent is exemplified. The frames transmitted with a density equal to or larger than the CCM frame transmission interval, or the data frames where a timing transmitted from the OAM-capable NE 200-A is provided between a failure occurrence time and the detection time (a period since the reception failure detection time point of a first CCM frame until the T_wait time elapses) cannot be received by the OAM-capable NE 200-Z.

According to the provision of Non Patent Literatures 5 and 6, it is determined that the connection is lost if, after one CCM frame used for confirmation of the path connection is received, a next CCM frame cannot be received within 3.5 times as large as the CCM frame transmission interval (operator set value). After the connection is lost, a switching request to the protection system is issued from the receiver communication device (corresponding to the OAM-capable NE 200-Z in this embodiment) to the transmitter communication device (corresponding to the OAM-capable NE 200-A), and the path switching operation is finally executed.

Accordingly, when a failure actually occurs on the path, and the path switching operation is required, after 3.5 times as large as the CCM frame transmission period elapses from a time when the failure occurs, the switching request is issued. That is, when the failure occurs during transmission of one CCM frame, the failure is detected at a time after 3.5 periods since a previous CMM frame transmitted before one CCM frame. Alternatively, when the failure occurs immediately after the CCM frame passes, the OAM-capable NE 200-Z detects the failure further after one period of the CCM frame transmission period.

The above problem is caused by a large time lag since the failure 3000 occurs until the failure 3000 is detected by the OAM-capable NE 200-Z. Under the circumstances, as solution to the problem, an embodiment of the present invention will be described below.

The feature of the present invention resides in that a reaction time to the failure at the time of switching to the protection is reduced with the use of the characteristics of the PON.

Figure 3:
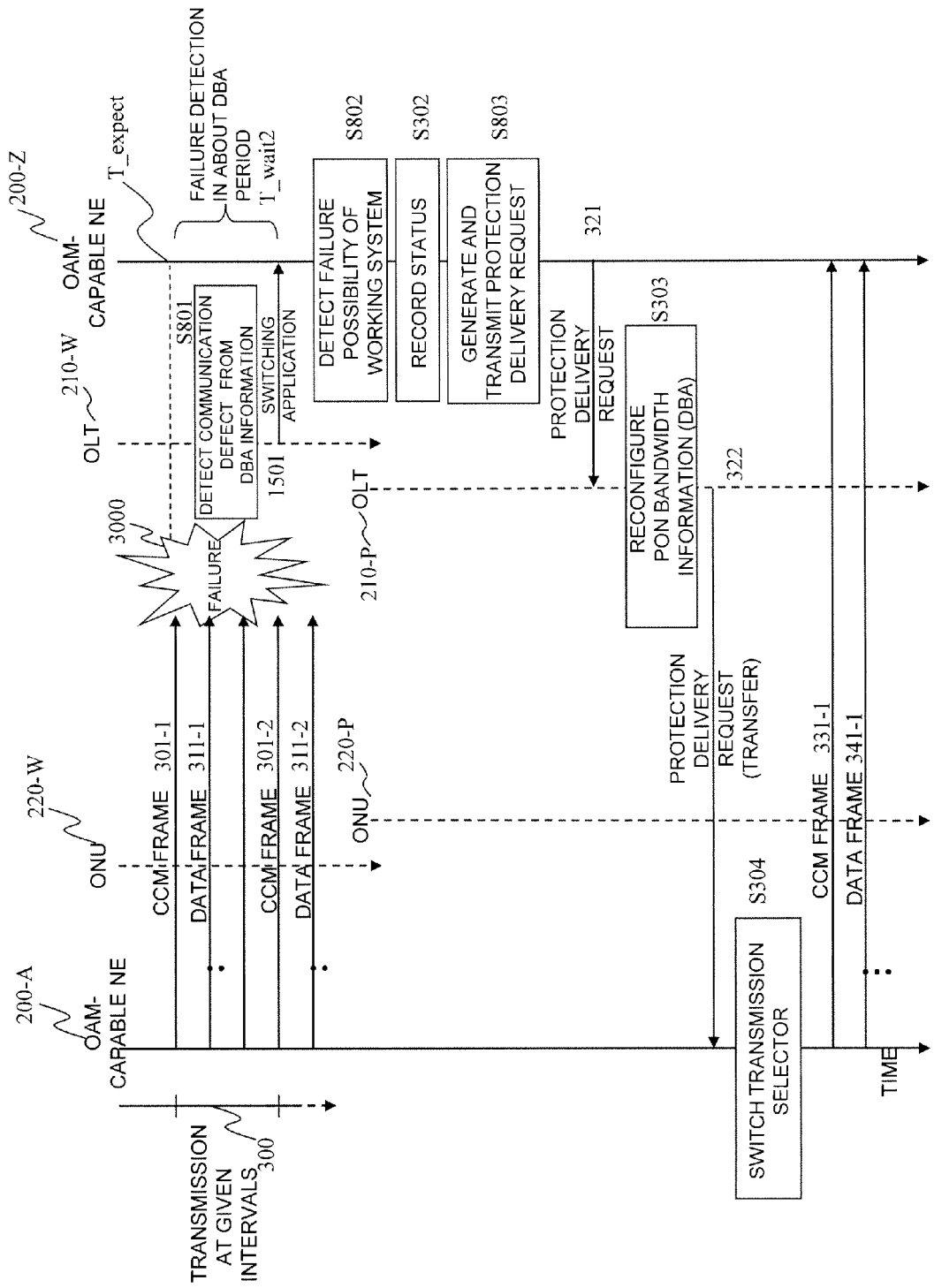
FIG. 3 is a sequence diagram illustrating a path switching procedure when the optical access network is included in a protection interval 2001.

FIG. 3 is a sequence diagram illustrating a path switching processing procedure from the working system to the protection system when the optical access network is included in the protection interval 2001.

When the failure 3000 occurs in the working path 2010-W, a frame that is going to pass through the working path is discarded. The frames flowing on the path include the CCM frames 301-1, 301-2, and user data frames 311-1, 311-2. The CCM frames 301-1 and 301-2 are periodically transmitted from the transmitter OAM-capable NE 200-A for monitoring the path status. FIG. 3 illustrates an appearance in which the OAM frames are periodically transmitted in the transmission period 300. The processing of the CCM frames 301-1 and 301-2 is conducted according to the standards, and therefore its description will be omitted.

The feature of this configuration resides in that a part of the protection interval 2001 is configured by the PON interval. For the purpose of accelerating determination for switching the communication path, failure detection and a switching instruction are conducted by the OLT 210-W that is a management device in the PON interval.

In this drawing, an instruction for switching to the protection system is conducted with a fact that there is a failure to receive a first CCM frame 301-1 after the failure 3000 occurs.

More specifically, in the case that the OLT 210-W refers to the OAM information and the DBA information in the PON interval, and cannot receive the CCM frame in a timing when the frame is to be received, it is determined that the failure occurs on the path (S801).

With introduction of this processing, this system can address the path failure more quickly than that of the existing system. In an example of the G-PON (Non Patent Literatures 1 to 3), the frame synchronous precision of the upstream frame received by the OLT 220-W is within 8 bits. Although the frame processing is delayed, the upstream frame is received with precision of several hundred psec to several nsec, and the defect can be detected in a time when the frame processing (analysis of received frame and notice to OAM-capable NE 200-Z) is conducted, that is, in about several dozen microseconds. The CCM frame transmission interval in the Ethernet OAM is 3.33 msec at the fastest rate. As described above, according to Non Patent Literature 5, it is determined whether the path state is good, or not, after the reception status is observed over 3.5 times as long as that time. As a result, sufficiently high-speed determination is enabled as compared with that in the existing system. As described above, in this example, a time taken since a time when the failure 3000 occurs till transmission of a switching application notice 1501 as illustrated in FIG. 3 is 10 microseconds. Also, a variation in the detection time is several hundred psec to several nsec. When the packet transport network including the PON is redundant, an effect of shortening the failure detection time is evident.

In order to further consider the effect in more detail, referring to the provision of the G-PON, the reception DBA period is 125 microseconds or longer (in fact, the period of several msec is frequently used). The bandwidth allocation is determined with reference to the reception status of the upstream frame from the ONU 220-W thereunder for each DBA period. Therefore, it is conceivable that the communication statuses of all the paths (flows) can be monitored in the OLT 210-W at least once for each DBA period. For example, it is conceivable that the failure detection becomes latest when only one frame is transmitted in each path (working path 2010-W and protection path 2010-P) for each DBA period. In this case, because the processing time of several dozen microseconds can be substantially ignored, it is conceivable that the failure detection can be conducted in about several msec by application of the present invention.

Another effect can be further expected with the use of the DBA information and the OAM information. This is because the reception time (timing) of not only the CCM frame but also the normal data frame can be managed. That is, when frames other than the CCM frame cannot be received in timing determined according to the OAM information or indicated by the DBA, the communication defect can be immediately notified the OAM-capable NE 200-Z of. As a result, the OAM-capable NE 200-Z can monitor the failure occurrence in the PON interval substantially in real time not depending on the transmission interval of the CCM frame, and start the switching process (S802).

Processing in the OAM-capable NE 200-Z, that is, the management of the transmission status of the packets to be transmitted to the external from the protection interval (S802, S302) can be conducted by the aid of the standard method. Also, processing subsequent to the communication progress record S302 (S803, S303) can be conducted by using the standard technology, and therefore their details will be described later.

Figure 4:
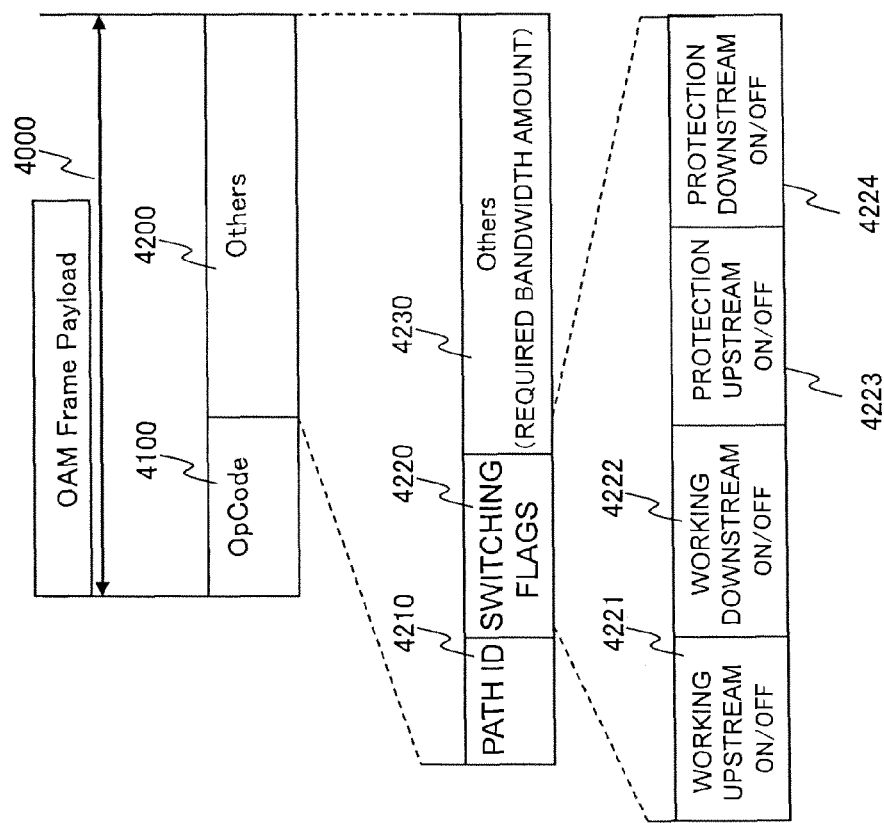
FIG. 4 is a configuration example of a protection delivery request frame that is transmitted by an OAM-capable NE 200-Z that detects a failure to a transmitter OAM-capable NE 200-A through a protection path.

FIG. 4 is a configuration example of the protection delivery request frame that is transmitted by the OAM-capable NE 200-Z that detects a failure to the transmitter OAM-capable NE 200-A through a protection path. This configuration example shows a configuration based on a vender specific OAM message (VSM) frame format defined by the Ethernet OAM advice (Non Patent Literature 5).

The OAM information is stored in a payload portion of a layer 2 (layer 2, hereinafter referred to as "L2") (description is given assuming the Ethernet in this example) frame of an OSI reference model, and transmitted. In the following description, the L2 frame including the OAM information is called "OAM frame". The OAM frame includes a destination media access control (MAC) address (DA; destination address), a source MAC address (SA; source address), a frame type (Ether type), and a payload, that is, an OAM information storage area. The device that receives this frame determines the type of frame with reference to given Ether type field values representative of the OAM frames.

The payload portion that stores the OAM information therein is specified in detail in Non Patent Literature 5, and therefore description of the individual OAM information will be omitted, and only the fields related to this embodiment will be described. The payload portion of an OAM frame 4000 includes code No. OpCode 4100 indicative of the VSM frame, and a control field 4200 of others.

A part of the control field 4200 is used in the protection delivery request used in this embodiment. The part of the control field 4200 includes a path ID (ID for identifying the subject path from other coexisting paths) 4210, and instruction contents in this frame, that is, a switching Flag 4220 for indicating a communication path to be used, for example, starting transfer of a frame transferred to the working system to the protection system. The switching Flag 4220 represents which of the working path and the protection path is used in each of the upstream and downstream communications. It is desirable that the switching Flag 4220 is so implemented as to indicate the delivery start and stop of the protection system, and the delivery start and stop of the working system for each path and for each communication direction. In this case, there is proposed a method in which, for example, 4 bits are prepared, and two bits (for working indication and protection indication) are allocated in each direction (4221 to 4224 in the figure). It is needless to say that the combination of indications may be allocated to numerical values of 0 to 7 by using three bits in the switching Flag 4220 field, or scalability can be ensured with the use of more bits.

Figure 5:
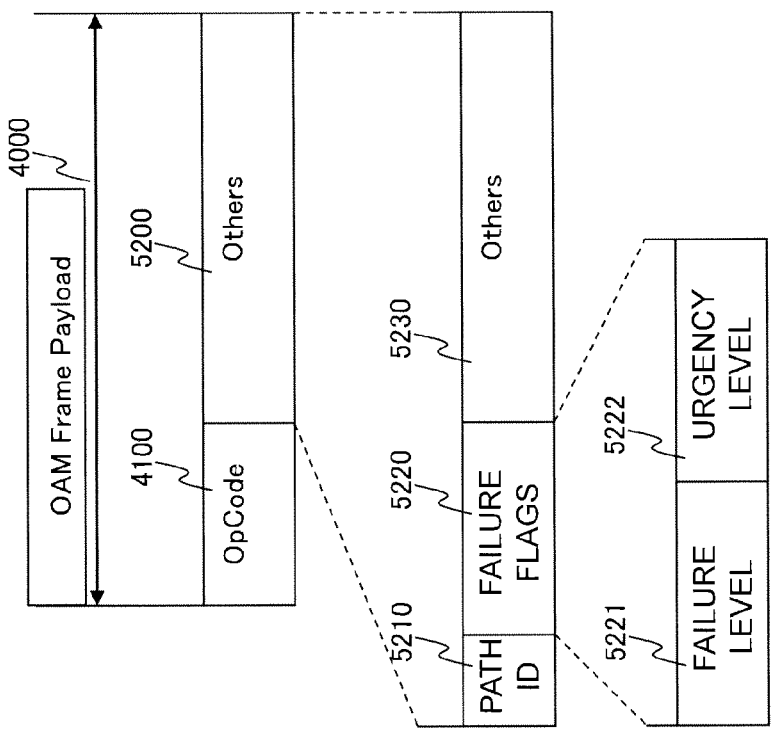
FIG. 5 illustrates a configuration example of a switching application frame transmitted from an OLT 210-W to an OAM-capable NE 200-Z in a sequence of FIG. 3.

FIG. 5 illustrates a configuration example of a switching application frame 1501 transmitted from the OLT 210-W to the OAM-capable NE 200-Z in a sequence of FIG. 3. This configuration example shows a configuration based on a vendor specific OAM message (VSM) frame format defined by an Ether OAM advice (Non Patent Literature 5) as in FIG. 4.

The switching application frame 1501 is stored in the payload portion of the L2 (description is given assuming the Ethernet in this example) frame and transmitted. The OAM frame includes a destination MAC address (DA; destination address), a source MAC address (SA; source address), a frame type (Ether type), and a payload, that is, an OAM information storage area. The device that receives this frame determines the type of frame with reference to given Ether type field values representative of the OAM frames. The payload portion of the OAM frame 4000 includes code No. OpCode 4100 indicative of the VSM frame, and a control field 5200 of others.

A part of the control field 5200 is used in a failure notice in the PON interval used in this embodiment. The part of the control field 5200 includes a path ID (ID for identifying the subject path from other coexisting paths) 5210, and instruction contents in this frame, that is, a failure Flag 5220 for giving notice of the failure status of the working system, based on a fact that the frame to be received in the working system cannot be received.

When the notice of the failure status and notice of urgency can be conducted by the aid of the failure Flag 5220, the information is useful to the failure countermeasure in the OAM-capable NE 200-Z. Therefore, in this embodiment, the subject field includes a failure level 5221 and an urgency level 5222. The failure level is a field indicative of the failure contents detected by the OLT 210-W. The failure contents include information such as the loss of signal (LOS) or the loss of frame (LOS), related to whether bit synchronization or frame synchronization is satisfactory, or not, and information related to the transmission power fluctuation of the ONU 220-W, a signal detection error caused by the failure of the OLT side receiver (PD or APD) (this error can be determined because a device alarm is issued in addition to the LOS), an in-frame bit error, and a frame reception timing distortion.

It is conceivable that, for example, the LOF, the in-frame bit error, and the reception timing distortion are low in the urgency level because they may be recovered in a short period. On the other hand, it is conceivable that the LOS, the receiver failure, and the power fluctuation of the ONU 220-W are relatively high in the degree of urgency because they may be related to the device failure. Because the setting of urgency is different depending on the device performance and the implementation system, it is desirable that a correspondence (table configuration, not shown) of the defect notice of the Ether OAM, the communication alarm of the PON interval, and the PON device alarm with the degree of urgency is changeably implemented.

Figure 6:
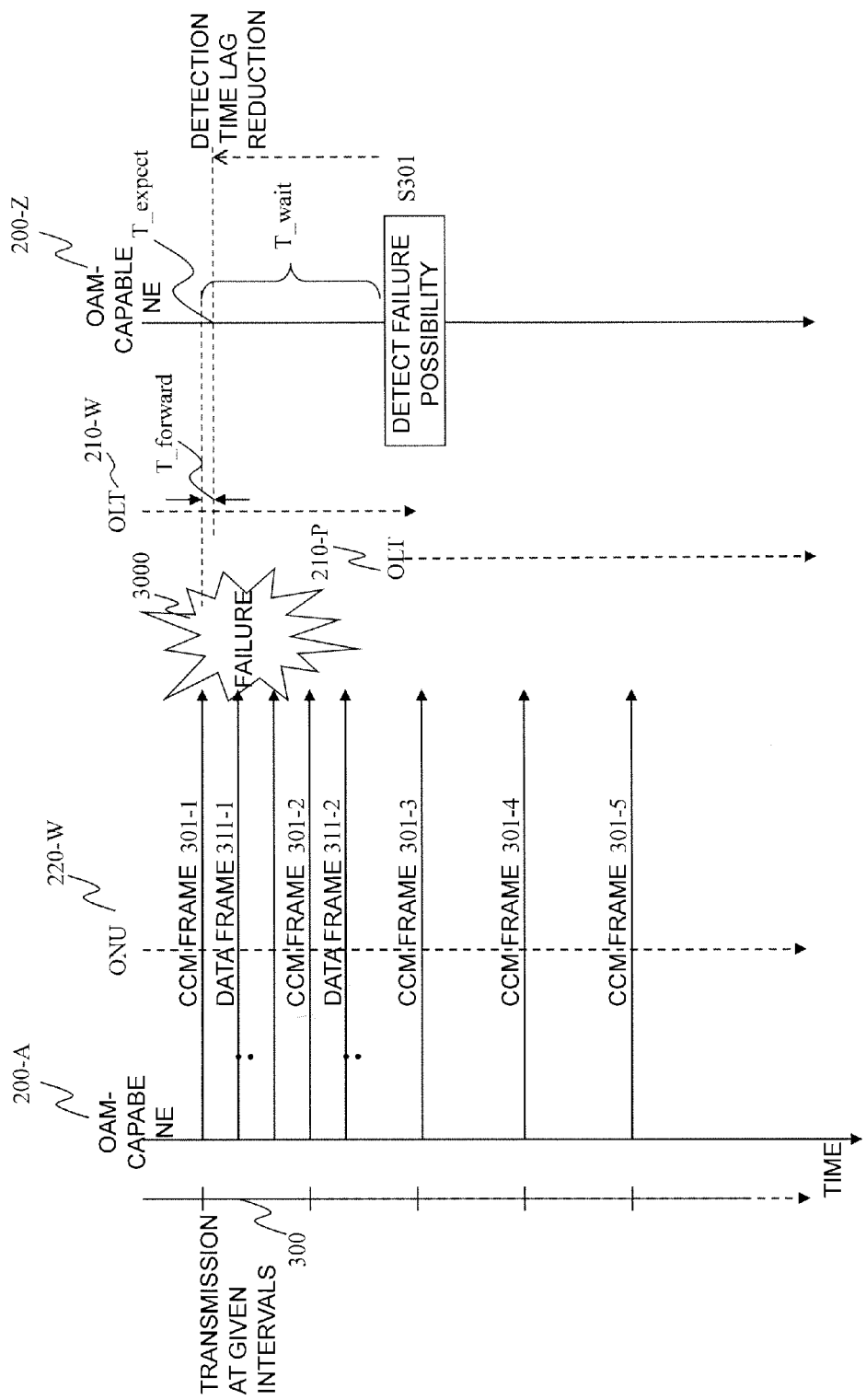
FIG. 6 is a timing chart illustrating effects of this embodiment as compared with FIG. 12.

FIG. 6 is a timing chart illustrating effects of this embodiment. This figure is a timing chart illustrating the effects in this embodiment as compared with the normal communication failure detection and path switching method.

Although not shown in detail in FIG. 3, actually, in order that the OLT 210-W receives the upstream frame, and conducts the frame header processing, and then transfers the subject frame to the OAM-capable NE 200-Z, for example, a time T_forward of several dozen microseconds is required. For that reason, T_expect detects that a scheduled CCM frame does not arrive several dozen microseconds after the OLT 210-W detects failure.

In this embodiment, the failure detection is implemented by the OLT 210-W. For that reason, the detection time can be extremely shortened as described above. Accordingly, a time since the OLT 210-W detects the failure until the OLT 210-W notifies the OAM-capable NE 200-Z of the failure can be actually realized with about several dozen microseconds that area time required for the frame transfer process in this example. In FIG. 6, T_forward substantially corresponds to a failure detection and notice frame transfer time. As a result, as compared with the normal path switching means, the detection time substantially corresponding to T_wait can be reduced. That is, the failure detection time T_wait2 illustrated in FIG. 3 is actually equal to T_forward.

As a result, it can be expected to further reduce an influence of the communication failure on user data. A frame transmission and reception timing gap in the PON interval falls within 125 microseconds for the period frame at a maximum from a structure of the DBA. The transmission and reception confirmation on the frame basis can be conducted by the failure detection in the time equivalent to the transfer time conducted by a normal router or switch.

4. Device Configuration of OLT

Figure 7:
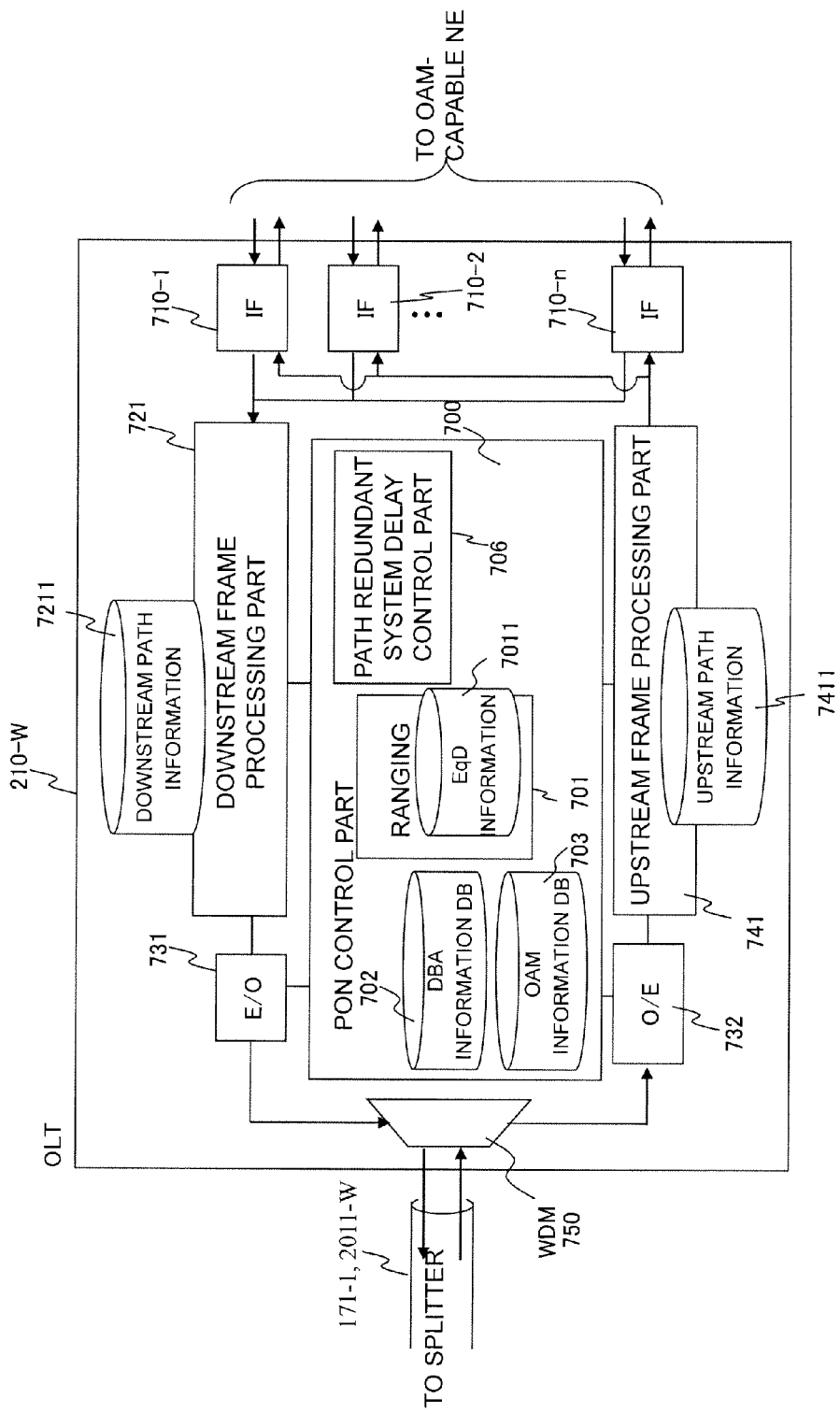
FIG. 7 illustrates a device configuration diagram of a station side optical signal terminal device (OLT).

FIG. 7 illustrates a device configuration diagram of a station side optical signal terminal device (OLT).

FIG. 7 illustrates a basic functional block of the working OLT 210-W. The protection OLT 210-P has the same functional block configuration.

The OLT 210-W includes one or plural packet network interfaces 710-1 to 710-$n$ in a service node interface (SNI). As a packet transmission protocol, an Ethernet interface of 10/100 Mbps or 1 Gbps is frequently used.

As usual, the OLT 210-W is implemented in an application specific integrated circuit (ASIC) or a field programmable gate array (FPGA), and plural OLT 210-W chips can be implemented in a housing located at the station side. In this configuration, there is proposed a configuration in which an L2 switch (not shown) is provided at a rear stage of plural interface boards on which the chip OLT 210-W is mounted, and the frame is transferred to the higher-order device through an L2 interface board located at the SNI side after the switch. In this case, the interfaces 710-1 to 710-$n$ provided in the OLT 210-W are connected to the L2 switch. The interfaces 710-1 to 710-$n$ are connected to the OAM-capable NE 200-Z through the switch and the L2 interface. Alternatively, in a simple configuration, the OLT 210-W and the OAM-capable NE 200-Z can be connected directly to each other.

Hereinafter, the operation of each of the downstream communication and the upstream communication will be described.

First, in the processing of the downstream signal, the user data is input to the SNI side interfaces 710-1 to 710-$n$ of the OLT 210-W through the relay network 2000 (refer to FIG. 1) and the OAM-capable NE 200-Z. The received data is transferred to a downstream frame processing part 721 where the packet header information is analyzed. In the downstream frame, the destination ONU 220-W to which the reception packet is to be transferred is determined on the basis of flow identification information including the destination information, the source information, and the path information included in the packet header. Conversion and allocation of the header information in the received frame are conducted as the occasion demands, together with the determination of the destination information. In order to determine processing including the destination determination, and the conversion and allocation of the header information, a downstream path information database (DB) 7211 provided in the downstream frame processing part 721 is referred to. The downstream path information database 7211 is a database for determining the frame processing with one or plural parameters including the header information VLAN, ID and MAC address in the received frame as a trigger.

In the downstream frame processing part 721, the received frame is changed into a frame format for a PON interval transmission according to header processing contents determined with reference to the downstream path information database 7211. Specific processing using G-PON (Non Patent Literatures 1 to 3) and Ethernet is different depending on the contents described in the path information database 7211. As one example, the processing includes VLAN tag processing (conversion, deletion, transmission, allocation) for the reception Ethernet frame, GEM header generation including a Port-ID set for transferred ONU, and capsuling of the reception Ethernet frame into the GEM frame.

Further, the downstream frame processing part 721 conducts processing for sending the GEM frame generated therein. This processing includes queuing and reading processes taking a frame processing priority into consideration, a downstream frame combination and sending for the PON interval. In the G-PON, there is a downstream frame transmission period for each 125 microseconds, and a downstream frame common header including a fixed pattern for synchronizing and loading the downstream frame at the ONU side is necessary in a start portion of the period (downstream frame). Plural GEM frames are inserted subsequent to the common header to form a downstream frame (Non Patent Literature 3).

Finally, the downstream frame read by a transmission processing part 723 is converted into an optical signal by an E/O processing part 731, and sent to the ONU 220-W through a WDM 750 and the optical fiber 171-1.

The processing of the upstream signal is conducted in the inverse order of the processing of the downstream signal. The upstream signal is transmitted from the ONU 220-W according to timing designated by the OLT 210-W, and multiplexed on the optical fiber 171-1 on which the optical signals are concentrated in time division. For that reason, the optical signals transmitted from the individual ONUs 220 come to a burst form where the optical signals are intermittently transmitted.

The optical signals received through the optical fiber 171-1 and the WDM filter 750 are synchronized with clocks and frames (frame end in the PON interval) on the basis of the fixed pattern called "preamble" and "delimiter" allocated to a head of the burst signal received by an O/E part 732. The extracted clock is used for confirming the operation of the PON system. That is, an obtained frame head position (reception timing) must be identical with a transmission instruction for the ONU 220, which is retained to a DBA information DB 702 in a PON control part 700 of the OLT 210-W. As a result of confirmation, if a difference from the communication time indicated by the OLT 210 is observed, a ranging part 701 of the PON control part 700 corrects a detected fluctuation value, and determines whether working continuation is enabled, or not. That is, if the fluctuation of a given threshold value or larger is observed, the ranging part 701 corrects the setting of EqD information 7011 for the ONU 220 in the subsequent downstream frame, and notifies the ONU that the EQD set value is to be corrected. The EqD information of each ONU 220 under the OLT 210-W is held as the EqD information 7011 within the PON control part 700. When treatment cannot be conducted with correction of the set value, the ONU 220 is again subjected to a ranging process according to an instruction of the ranging part 701 to update the EqD information 7011.

The setting of the frame end and the EqD necessary for the data reception accompanied by the frame end is the parameters obtained as a result of the ranging process described in FIG. 1. The ranging process is implemented by the ranging part 701.

The upstream frame received by the O/E part 732 is transferred to an upstream frame processing part 741. In the upstream frame processing part 741, header information of the upstream frame is analyzed to determine the contents of the header information processing and a destination of the frame. In this situation, the determination of the destination is enabled by referring to an upstream path information DB 7411. The determination of the header processing contents and the frame destination can be conducted with reference to the L2 header information of the frame, and particularly capsule header information for the PON interval transmission becomes important parameter. In an example of the G-PON, it is general that one or plural pieces of Port-ID information, which is allocated for each ONU, is used as a trigger for determination of the header processing contents and the frame destination. It is needless to say that the GEM header information and the L2 information can be combined together as a trigger for searching the path information DB 7411. As in the case of the downstream data processing, the upstream path information DB 7411 can also include the processing contents of the L2 header information. The packet format of the GEM frame becomes unnecessary after the GEM frame is terminated by the upstream frame processing part 741. The payload information carried in the GEM frame is used within the upstream frame processing part 741 in reassembling for sending the transfer information from the SNI side interface 710.

Also, in the upstream frame processing part 741, the information received in the GEM frame format is converted into a format (Ethernet in this embodiment) conforming to a packet transfer protocol, and transferred to a service node interface (SNI) interface 710. Also, when the frame is generated within the OLT 210 such that there is a frame transmission notice from the PON control part 700, the frame is newly configured by the upstream frame processing part 741, and the generated frame is transferred to the SNI interface 710.

Hereinafter, a specific example of the frame transfer operation will be described. The L2 header information is processed (e.g. the operation of the VLAN information) by the upstream frame processing part 741 on the basis of the header information of the GEM frame. Also, a header (internal header) for internal processing such as discriminating the user (ONU 220) is inserted into the device, and necessary information is further added and changed. Thereafter, the frame is sent. When the frame is sent, necessary processing is conducted such that the internal header used in the processing within the device is deleted, and correction is conducted when an error is found in the frame information due to a transmission error, thereby shaping the Ethernet frame. Through the above process, the upstream frame is sent through the SNI side interfaces 710-1 to 710-n. Thereafter, the upstream frame is transmitted to the OAM-capable NE 200-Z through a relay unit such as the L2switch (not shown) disposed outside the OLT 210-W, or directly.

Subsequently, the OAM information (OAM frame) processing in the OLT 210-W will be described. In the connection with the OAM-capable NE 200-Z, a device configuration in which the OLT 210-W and the OAM-capable NE 200-Z, which are connected by an in-device bus, are integrated together can be applied even if a general-purpose protocol such as the Ethernet is used through the SNI side interfaces 710-1 to 710-n. As one example, a description will be made assuming a configuration connected by the Ethernet according to the configuration of the first embodiment.

Also, in the first embodiment, it is assumed that the VSM frame of the Ethernet OAM illustrated in FIG. 6 is used for a failure state notice from the OLT 210 to the ONU 220.

In the connection state monitoring in the PON interval, the CCM frame of the Ethernet OAM may be referred to as in the monitoring technique between the OAM-capable NEs 200-A and 200-Z. Also, the connection state monitoring in the PON interval can be realized by monitoring all the frames transferred in the PON interval. Even if any technique is used, the communication defect detection using the DBA function which is a specific function of the PON is conducted as the communication status monitoring means in the PON interval. Under the circumstances, the former example will be first described, and then the embodiment will be described with the latter example.

First, the upstream OAM frame processing will be described. Upon receiving the OAM frame from the OAM-capable NE 200-A, the reception processing unit 721 recognizes that the received frame is an OAM frame according to the L2 header information of the frame. The OAM frame is transmitted by the OAM-capable NE 200-A at a specific transmission interval and in a specific transmission timing which are set in each system.

when any failure occurs in the working path 2010-W, and the upstream communication cannot be conducted, the following operation is conducted.

In the OLT 210-W, when the upstream signal is not received in the timing conforming to an OAM information 703, an LOS alarm is issued in conformity to the PON system. Also, when no LOS alarm is issued, a case in which the CCM frame is not correctly loaded may be issued. For example, in such a case that arrival at an expected time cannot be confirmed, it is conceivable that any defect occurs in the upstream communication function on the path.

In the OLT configuration of FIG. 7, the reception interval of the CCM frame is set for the OAM information DB 703, and the upstream frame transmission timing is instructed in the PON interval by the OLT 210-W, correctly, the PON control part 700. For that reason, except for a change in the signal arrival timing of the optical level, which is observed due to the expansion and contraction of the optical fiber caused by a temperature variation or the like, it is unlikely that the reception timing of the OAM frame (CCM frame) becomes abnormal in a normal operation. Accordingly, in the OLT 210-W, a PON control part 400 observes an arrival timing of the OAM frame in addition to an arrival timing of the upstream frame from each ONU 220-W, thereby enabling defect on the path to be detected. In this example, setting of the CCM transmission and reception timing for the OLT 210 can be achieved by a method of giving notice from the OAM-capable NE 200-A or the OAM-capable NE 200-Z, or a method of setting the timing directly to the OLT 210 by a manager. In this embodiment, because those means are not related to the essence of the present invention, their description will be omitted.

This function (path monitoring function using the OAM frame) can be realized by determining whether there is the OAM frame, or not, in the reception control part 741 of the upstream frame in the OLT 210, notifying the PON control part 700 of the arrival timing, and confirming whether the timing is appropriate, or not, with reference to the OAM information 703 by an OAM timing control part 706. As a result, as in the existing standardization advice (Non Patent Literature 6), the defect state occurring on the path can be detected according to the arrival status of a first (individual) OAM frame (CCM frame) without confirming the arrival statuses of plural OAM frames (CCM frames).

The OLT 210-W that detects the path defect transmits the frame (switching application frame) 1501 giving notice of the defect to the OAM-capable NE 200-Z. In this situation, in the interior of the OLT 210, the upstream frame processing part 741 generates the switching application frame 1501 for defect notice with respect to the OAM-capable NE 200-Z according to an instruction from a delay control part 706. The generated switching application frame is notified the OAM-capable NE 200-Z of through an appropriate interface among the interfaces 710-1 to 710-n.

In the OAM-capable NE 200-Z, when the path defect is detected by receiving the switching application frame 1501, a path switching request (protection delivery request) 321 is transmitted to the opposing OAM-capable NE 200-A through the PON interval (OLT 210-P and ONU 220-P) configuring the protection system.

Figure 8:
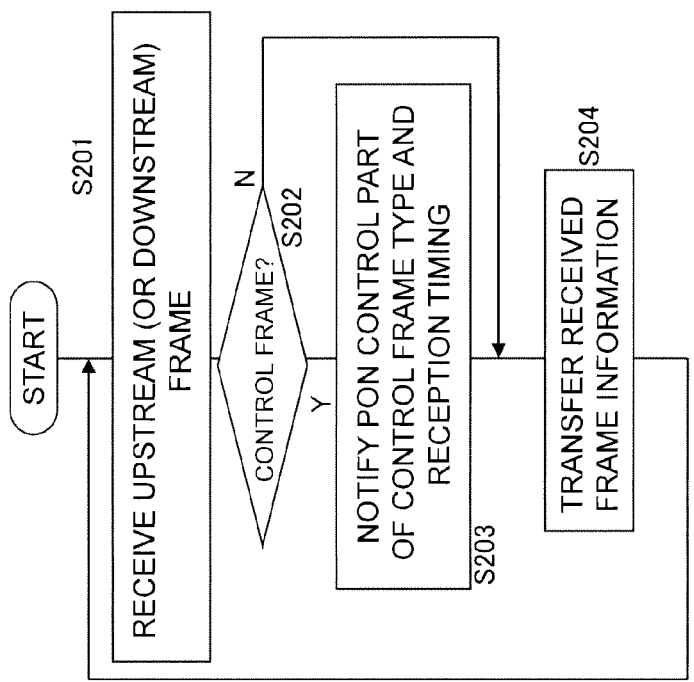
FIG. 8 is a flowchart of OAM frame processing in a PON receiving part 741 of the OLT210-W.

FIG. 8 is a flowchart of OAM frame processing in the upstream frame processing part 741 of the OLT210-W.

Upon receiving the upstream frame (S201), the upstream frame processing part 741 of the OLT 210 determines whether the upstream frame is an OAM frame or a normal data frame (S202). If it is the OAM frame, the upstream frame processing part 741 records the type of OAM frame and the reception timing, and notifies the PON control part 700 of the type and the reception timing (S203). The upstream frame processing part 741 notifies the PON control part 700 of the OAM frame transfer status, and transmits the OAM frame transfer status to a transmission processing part 423 for transferring the frame per se to the OAM-capable NE 200-Z. In this case, when an identifier for identifying the OAM frame is allocated to an internal header, the OAM frame is conveniently discriminated from other frames during the frame transmission processing.

In a received frame determination S202, if it is determined that the received frame is a data frame, the normal transfer processing is conducted.

The frames received in the upstream frame processing part 741 include not only the OAM frame and the data frame, but also a control frame (for example, physical layer OAM (PLOAM) message assuming a case of G-PON) message in the PON interval, a request for various ONU controls, and an ONU management and control protocol (OMCI) and the like. When the frame to be terminated in the PON interval is received, notice of the frame reception is given from the upstream frame processing part 741 to the PON control part 700.

Figure 9:
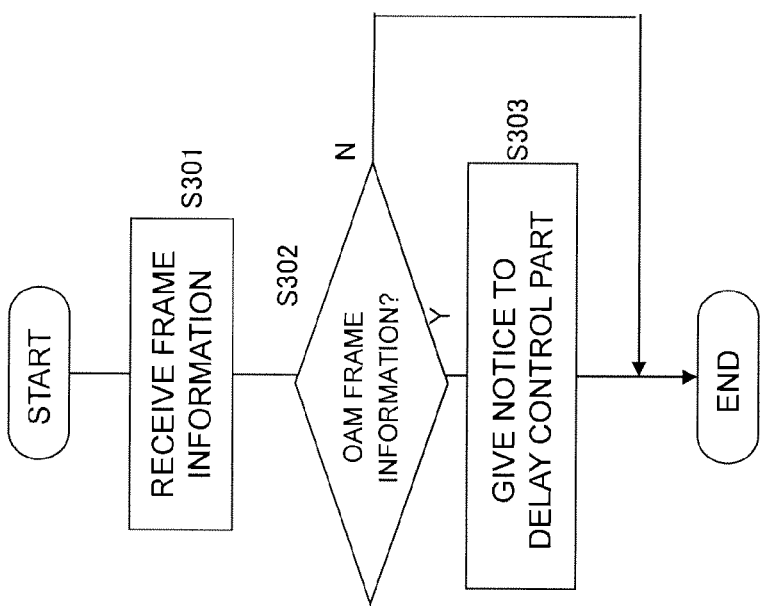
FIG. 9 is a flowchart illustrating the operation of a PON control part 700 of the OLT 210-W.

FIG. 9 is a flowchart illustrating a flow of a control signal in the PON control part 700 of the OLT 210-W.

Upon acquiring control frame information from the upstream frame processing part 741 (S301), it is determined whether the subject frame is an OAM frame, or not (S302). If the frame is the OAM frame, a part or all of the information is notified a path redundant system delay control part 706 provided in the PON control part 700 of (S303). If the frame is not the OAM frame, the frame information from a reception processing part 711 includes a bandwidth request from the ONU 220-W, OMCI information for ONU control, or a PLOAM message for maintaining and managing a TC layer and an optical layer of the ONU. The information is used as a bandwidth (BDA) control information in the PON control part 700 or used for the ONU state management, and some processing for the OAM-capable NE 200-Z is not required. For that reason, after Step S302, the processing of that information is completed.

Figure 10:
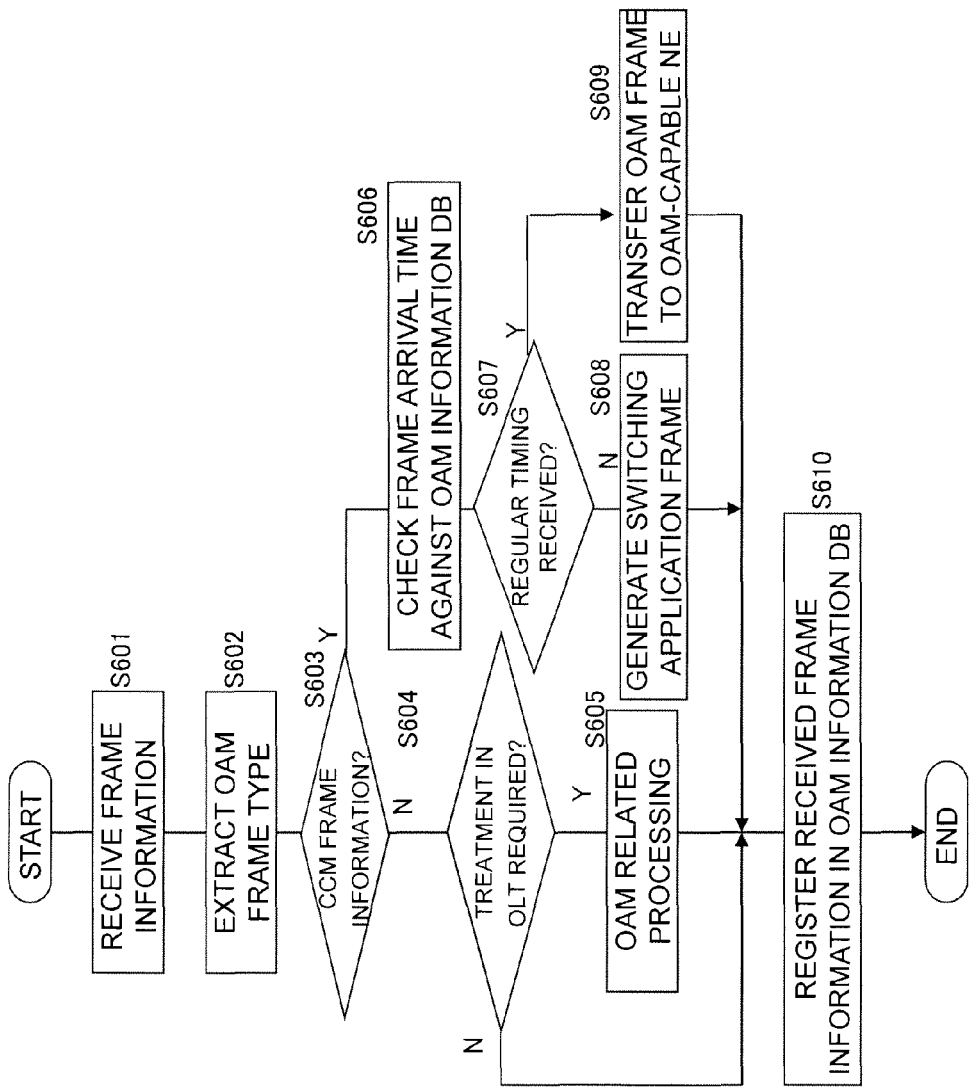
FIG. 10 is a flowchart illustrating the operation of a delay control part 706 of the OLT 210-W.

FIG. 10 is a flowchart illustrating the operation of the delay control part 706 of the OLT 210-W. The figure is related to the process S801 in the sequence diagram of FIG. 3 and the transmission of the switching application 1501.

Through the processing of FIG. 9, upon acquiring the OAM frame information from the upstream frame processing part 741 (S601), the type of the OAM frame and the reception timing of the subject frame are extracted (S602).

Further, it is determined whether the acquired OAM frame is the CCM frame, or not (S603). If it is the CCM frame, the frame arrival time is checked against the OAM information DB 703 provided in the device (S606), and it is confirmed whether the CCM frame can be received in a regular timing conforming to the network setting, or not (S607). This confirmation process can be realized by comparing the set information of the OAM information database 703 provided in the OLT 210 with the reception time and the path information of the CCM frame.

If it can be confirmed that the CCM frame is received in the regular timing in Step S607, the frame is transferred to the OAM-capable NE 200-Z that is a destination terminating device (S609). Thereafter, parameters related to the system operating status obtained by the OAM, that is, a communication status in the path to be monitored are recorded in the OAM information database 703 (S610). Specific parameters are, for example, a target path identifier, the type of the OAM frame that confirms the reception, and a time at which the reception of the OAM frame is confirmed.

On the other hand, if it cannot be confirmed that the frame is received in the regular timing in Step S607, the switching application frame is generated (S608). The switching application frame is notifies the OAM-capable NE 200-Z of through the upstream frame processing part 741.

In Step S603, if the acquired OAM frame is the OAM frame other than the CCM frame, a basis processing flow implements processing conforming to the OAM processing provision of Non Patent Literature 5. More specifically, referring to the OAM information database 703 set for each type of the OAM, it is confirmed whether the received OAM frame passes through a correct path, or not, and whether the received OAM frame includes correct information, or not, and necessary actions are further conducted (S605).

Figure 11:
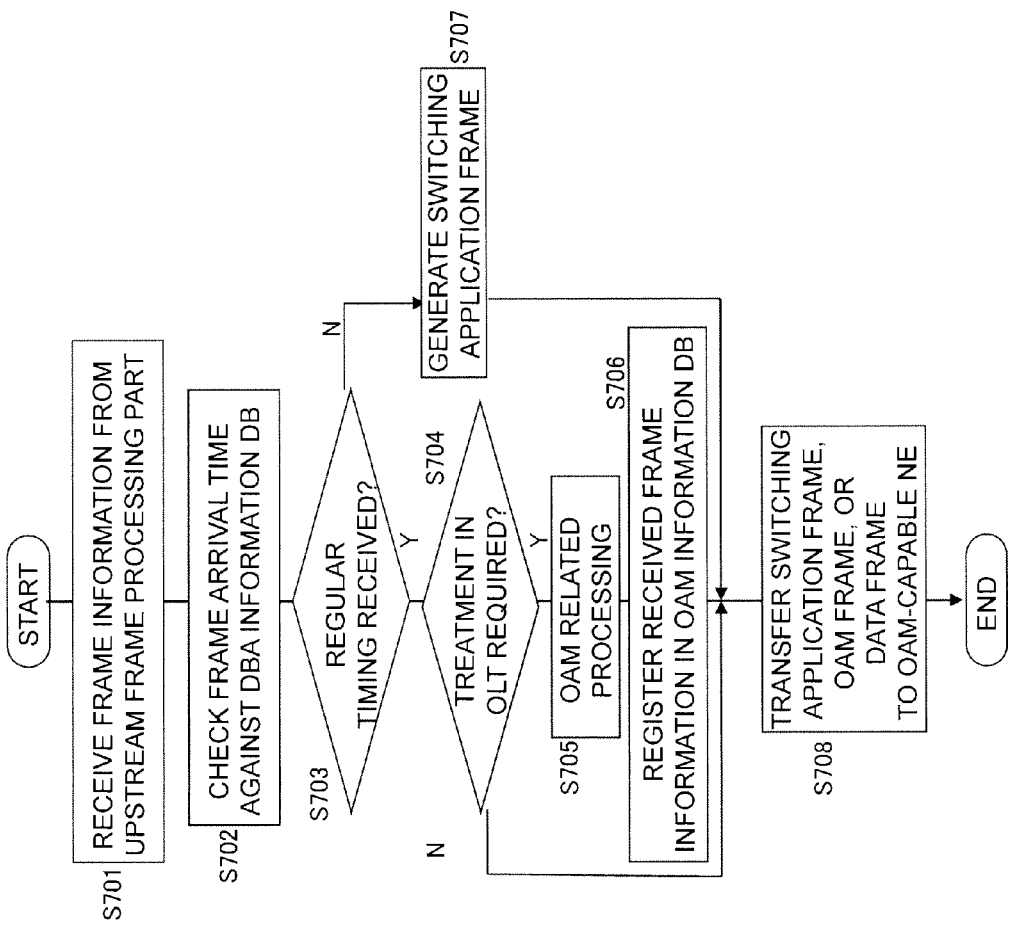
FIG. 11 is a flowchart illustrating another realizing method of communication defect detecting means in the OLT 210.

FIG. 11 is a flowchart illustrating another realizing method representative of the operation of the (communication defect detection) delay control part 706 for transmitting the switching application in the OLT 210. This figure is related to the processing S801 in the sequence diagram of FIG. 3 and the transmission of the switching application 1501.

The procedure illustrated in this figure is a procedure for not the communication defect detection using the OAM frame as illustrated in FIGS. 8 to 10, but detection of the communication defect in the PON interval with respect to all of the upstream frames.

The delay processing part 706 acquires information related to the upstream reception frame received by the upstream frame processing part 741 (S701). The information related to the frame described in the present description includes direct information representative of the type of frame (contents) per se as well as indirect information representative of the system operating state such as the frame reception time.

Subsequently, the frame reception time among the acquired information is compared with the DBA information database 702. An upstream frame transmission time slot information notified the ONU 220 of from the OLT 210 is stored in the DBA information database 702 (refer to FIG. 12). Accordingly, with the use of the DBA information database 702, it can be confirmed whether the frame is received in the regular timing, or not (S703). In the determination of whether the timing is regular, for example, if consistence with a parameter described in the DBA information database 702 can be confirmed within a range of a given threshold value, it can be determined that the timing is regular.

If a large difference exceeding the given threshold value is observed as compared with the regular timing in Step S703, the delay control part 706 generates the switching application frame 1501 (S707), and notifies the OAM-capable NE 200-Z of the switching application frame 1501 through the upstream frame processing part 741.

The frame received in the regular timing may be subjected to the processing commensurate with the frame. In the processes subsequent to Step S704, an example of the procedure is illustrated. When the received frame requires some treatment of the OLT 210, that is, bandwidth request information from the ONU control information or the ONU is treated within the PON control part 700. Also, when the OAM frame is received, the processing required by the OAM frame is implemented (S705). Thereafter, the information on the reception time, the type of OAM frame or the like is recorded in the OAM information database 703 for confirmation of the status as in the case of FIG. 10 (S706). In this example, the OAM related processing can include the OAM processing disclosed in Non Patent Literature 5 such as loop back (LB) processing or link trace (LT) processing.

After implementation of the above processing, the delay control part 706 transmits the frames required to be transferred to the OAM-capable NEs 200-A, 200-Z, or the ONU 220 in Step S708. That is, in the frames conceivable in this example, there are the transmission of the switching application frame 1501, the transmission of the upstream or downstream OAM frame, and the transfer of the user data frame.

This system always monitors the communication state of the PON interval, and can rapidly address the communication failure of the PON.

Figure 12:
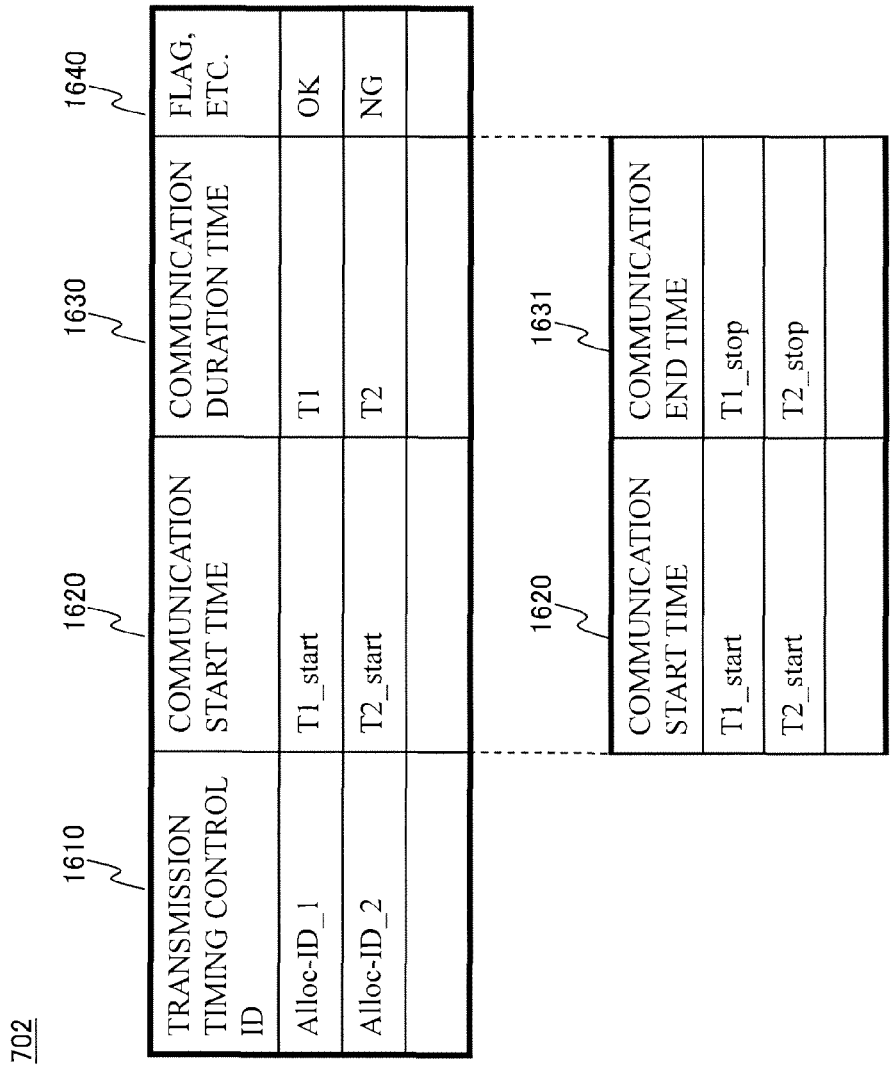
FIG. 12 illustrates a configuration example of a DBA information database 702 provided in the OLT 210.

FIG. 12 illustrates a configuration example of the DBA information database 702 provided in the OLT 210.

A basic configuration of this database includes a bandwidth control identifier 1610 for indicating a bandwidth control unit, an upstream frame transmission start time 1620 calculated and determined for each bandwidth control identifier 1610 (by PON control part), a communication time 1630 indicative of a communication duration time since the transmission start till the transmission end, and flag information, etc., 1640.

The transmission timing control ID is called "bandwidth allocation ID (Alloc-ID)" in the G-PON. One or plural parameters can be set for each ONU. The upstream frame bandwidth request transmitted from the ONU 220 is treated on the Alloc-ID basis. Accordingly, the ONU 220 to which the plural Alloc-IDs are allocated can transmit plural bandwidth requests to the OLT 210 for each DBA period.

The bandwidth designation method for each Alloc-ID using this table is roughly classified into two methods. This figure illustrates those methods. In one method, the transmission start time 1620 and the subsequent communication duration time 1630 are notified the ONU 220 of. In the other method, the transmission start time 1620 and the communication end time 1631 are designated. Even if any method is used, the upstream transmission bandwidth control of the ONU 220 for each Alloc-ID can be realized.

In the OLT 210, the frame reception timing of the frame received by the upstream frame processing part 741 is compared with the DBA information database 702 of the figure, and it is confirmed whether the ONU 220 accurately operates, or not. On the basis of this result, it is determined whether there is a communication defect, or not.

Figure 13:
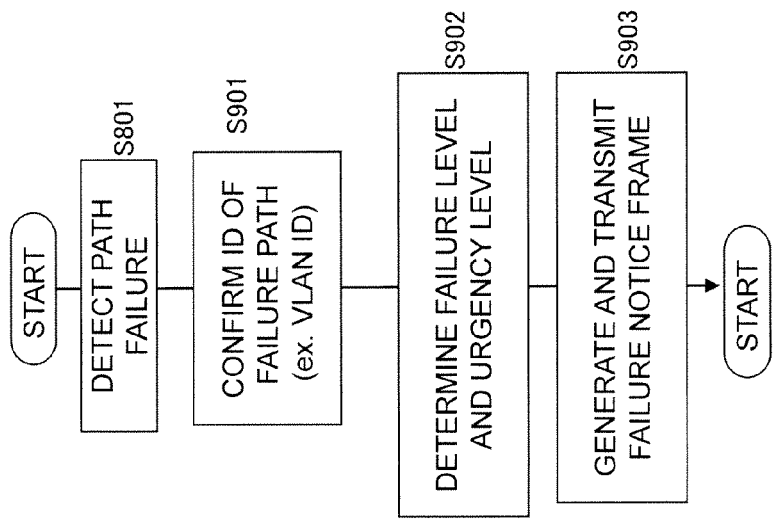
FIG. 13 is a flowchart illustrating a procedure of generating a switching application frame 1501 in a path switching sequence of FIG. 3.

FIG. 13 is a flowchart illustrating a procedure of generating the switching application frame 1501 in the path switching sequence of FIG. 3.

In generation of the switching application frame, there is a need to determine the path ID 5210 and the switching flag 5220.

Identifiers of the working path 110-A (2010-W) and the protection path 120-A (2010-P) illustrated in FIGS. 1 and 2 can be selected from plural identifiers according to the communication protocol used between the OAM-capable NEs 200-A and 200-Z. In this embodiment, as one example, because a network configuration using the Ethernet is assumed, for example, the most general VLAN ID can be used as the path ID. As the occasion demands, the combination of plural VLAN IDs or the combination of the VLAN ID with an MPLS label can be applicable. An example in which the VLAN ID is used as the identifier of the monitored path will be described in brief.

Through path failure detection S801 in the sequence diagram of FIG. 3, in the OLT 210 configuring the working path, the path ID (VLAN ID in this example) configured by the ONU (although it is Alloc-ID in fact, since the ONU-ID and the Alloc-ID are associated with each other at the OLT 210 side, the ONU can be specified) which detects the failure is extracted from the received frame (S901). This is inserted into the switching application frame of FIG. 5 as the path ID.

Further, as described in the switching operation, the OLT 210 determines the failure level and the urgency level indicative of the degree of importance of the treatment request if necessary. Those level determinations are conducted taking contract detail with clients associated with the path ID, and the path failure status into consideration. For example, when the path ID accommodates the important client, or when the communication defects are detected in the plural ONUs 220, and it is assumed that the failure exists in a basic portion of the working path, the urgency level is set to be higher.

Finally, the switching application frame inserting the above parameter is generated, the frame is transmitted to the OAM-capable NE 200-Z through the upstream frame processing part 741, and a series of processing is completed.

5. Device Configuration of OAM-Capable NE

Figure 14:
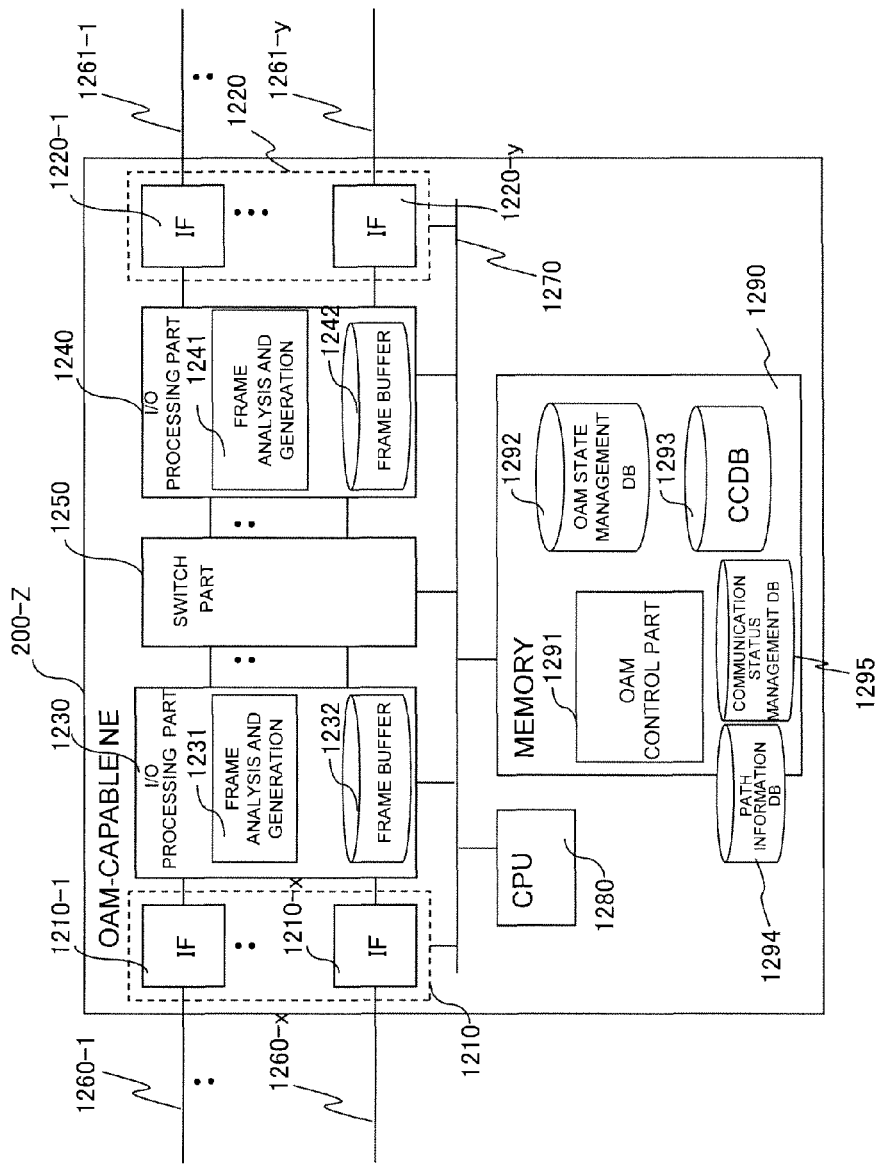
FIG. 14 illustrates a configuration diagram of an OAM-capable NE 200.

FIG. 14 illustrates a configuration diagram of the OAM-capable NE 200.

The OAM-capable NEs 200 are located at both ends of the protection interval to define a protection interval, and also determine the use path for the packet passing through the interval with reference to the header information.

For example, the OAM-capable NE 200-Z includes interfaces 1210-1 to 1210-x at the optical access system side, an I/O processing part 1230, a switch part 1250, interfaces 1220-1 to 1220-y at the relay network 2000 side, an I/O processing part 1240, a CPU 1280, and a memory 1290. Also, the OAM-capable NE 200-A can replace the connections of the interfaces between the optical access side and the relay network side. Since the functional configurations are identical with each other, the OAM-capable NE 200-Z will be described as one example.

The OAM-capable NE 200-Z periodically receives the CCM frame from the OAM-capable NE 200-A with the use of the upstream frame in the PON interval. In the working path 2010-W, the frame that passes through the PON interval is received by any one of the interfaces 1210-1 to 1210-x in the OAM-capable NE 200-Z. The OAM-capable NE 200-Z grasps the path state with reference to the information included in the OAM frame.

The upstream (direction from left to right in FIG. 2) communication will be exemplified. The packets received by the interfaces 1210-1 to 1210-x are transferred to the I/O processing part 1230. In the I/O processing part 1230, the packets are temporarily stored in a frame buffer 1232 for packet transmission control such as header processing and priority allocation. With the use of this wait time, a frame analysis and generation part 1231 conducts confirmation of the header information and processing (conversion, transmission, allocation, deletion or the like) of the header information with a parameter included in the header as a trigger. For the header analysis and generation, the frame analysis and generation part 1231 refers to path information DB 1294 set for the OAM-capable NE 200-Z. The I/O processing part 1230 accesses to the memory 1290 for referring to the path information DB 1294, but can hold a part of the path information in the I/O processing part 1230 depending on the situation of implementation. Anyway, the flow of operation does not change. This embodiment shows an example in which a bus 1270 is used for delivering the signals within the device.

The frames processed by the frame analysis and generation part 1231 so as to provide appropriate header information for destination is transmitted to the switch part 1250 for transfer toward the destination path.

In the switch part 1250, each frame is transferred to a course corresponding to each destination. The frame that has been transferred to each course conducts queuing, and confirmation and change of the header information if the occasion demands, according to the priority and the path information on each course. Functions for conducting those processing are provided in a frame analysis and generation part 1241 and a frame buffer 1242 located at the transmitter side. The frames read by the I/O processing part 1240 are transmitted to the external through the interfaces 1220-1 to 1220-y.

A path management method during the upstream communication in the OAM-capable NE 200-Z will be described. The received frame analysis and generation part 1231 determines whether the frames received by the interfaces 1210-1 to 1210-x are the OAM frames (for example, CCM frame 301-1), or not. If the received frame is the OAM frame corresponding to the path to be managed of the OAM-capable NE, the I/O processing part 1230 extracts the redundant path ID and the transmission timing ID included in the frame, and notifies an OAM control part 1291 within the memory 1290 of those information. A series of processing for confirming arrival interval of those CCM frames from both the paths, and confirming the communication status in each path is conducted by the OAM control part 1291.

Upon receiving the OAM frames from the I/O processing part 1230, the OAM control part 791 confirms the type of OAM, and searches an OAM state management database (DB) 1292 for each OAM function with reference to the parameters set in the system. As a result of matching, if some defect is found on the path, alarm is issued according to the standardization advice (Non Patent Literature 5).

The OAM frame used for monitoring the path connecting the OAM-capable NEs 200-A and 200-Z is terminated by the OAM-capable NE 200-Z. Therefore, if the received frame is the OAM frame, the frame is transferred to the memory 1290, and the OAM frame is analyzed by the memory 1290. In this situation, no frame is transferred to the switch part 1250. When the switching application frame transmitted from the OLT 210 is implemented by a format of the VSM frame in the Ethernet OAM, the frame falls into this category, and therefore this processing is the same as the above processing.

For example, when a frame configuration (refer to FIG. 5) based on the VSM frame is assumed as the switching application frame, setting related to the paths through which the individual VSM frames pass, that is, information related to a correspondence of the header information of the frame with the header processing and the transmission course is held in the path information DB 1294. After the path information DB 1294 is set, an OAM state management DB 1293 is configured with reflection of the setting.

As soon as the transmission path and the processing contents that receive each OAM frame are determined, the OAM-capable NE 200 executes the processing. That is, when the OAM-capable NE 200 receives the switching application frame, the OAM-capable NE 200 immediately changes the use status of the redundant path at the subject device side, and notifies the opposing OAM-capable NE of the path switching. After generated by the memory 1290, the notice frame is transferred to the I/O processing part 1240, and transmitted through the transmission interface 1220 and a transmitter line 1261. The transmission interface 1220 and the transmitter line 1261 can be formed of the same medium as the input interface 1210 and an input line 1260 as physical lines.

In the communication device conforming to the standardization provision (Non Patent Literature 5), the OAM information held in the OAM state management database 1292 of the OAM-capable NEs 200-A and 200-Z is referred to for detecting the defect of the reception interval of the CCM frames. The OAM information is updated at given intervals with reception of the OAM frames, an updated status of the system can be referred to by referring to the OAM state management DB. On the other hand, the OAM setting information is normally an operation provision set by an operator, and hardly dynamically changes. For example, the registration of the maintenance and management interval used for checking the CCM frame is set for the CC database (CCDB) 1293. Whether the CCM frame is correct in conformity to the setting, or not, is confirmed by extracting various maintenance and management parameters included in the frame by the OAM control part 1291 and checking the parameters against the CCDB 1293 after receiving the frame by the reception processing part 1241. If the frame is correct, each parameter is stored in the CCDB. The OAM state management DB 1292 has the meaning close to that of the CCBD 1293, and a database that manages the OAM information other than the CCM may be regarded as the OAM state management DB 1292.

In this embodiment, without using the wait time based on the transmission interval of the CCD frames, the failure switching is triggered by the reception of the switching application frame transmitted from the OLT 210. With the use of this system, the wait time normally required for confirming the state of the plural CCM frames is not required, and the protection switching of the optical access according to this embodiment can be remarkably rapidly conducted on the path failure.

Figure 15:
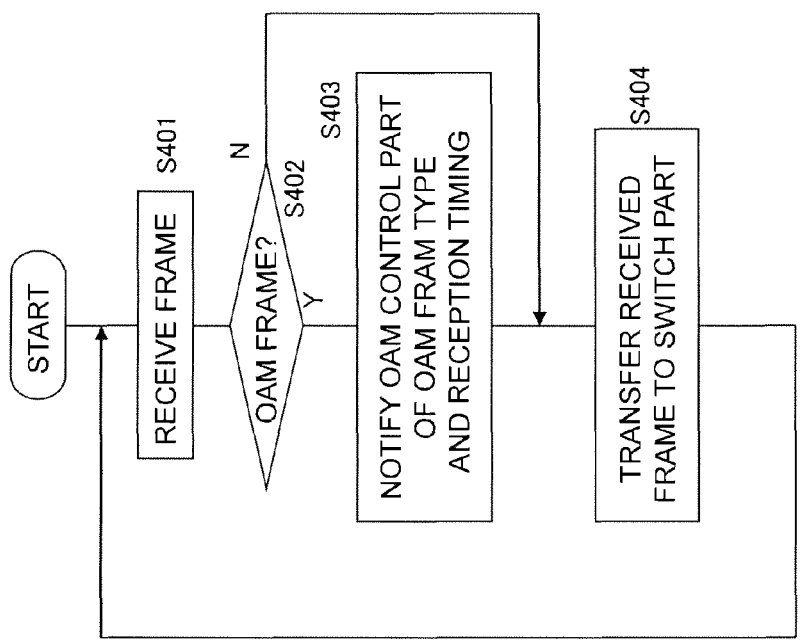
FIG. 15 is a flowchart illustrating frame processing in an I/O processing part of the OAM-capable NE.

FIG. 15 is a flowchart illustrating frame processing in the I/O processing part of the OAM-capable NE.

Upon receiving the frame (S401), the I/O processing part 1230 or 1240 determines whether the frame is the OAM frame or the normal data frame (S402). In this situation, if the frame is the OAM frame, the I/O processing part 1230 or 1240 records the type and the reception timing of the OAM frame, and notifies the OAM control part 1291 of those information (S403).

If it is determined that the frame is the data frame in the received frame determination S402, the I/O processing part 1230 or 1240 conducts the header processing of the frame, and the transfer of the switch 1250, and conducts the normal transfer processing (S404).

Figure 16:
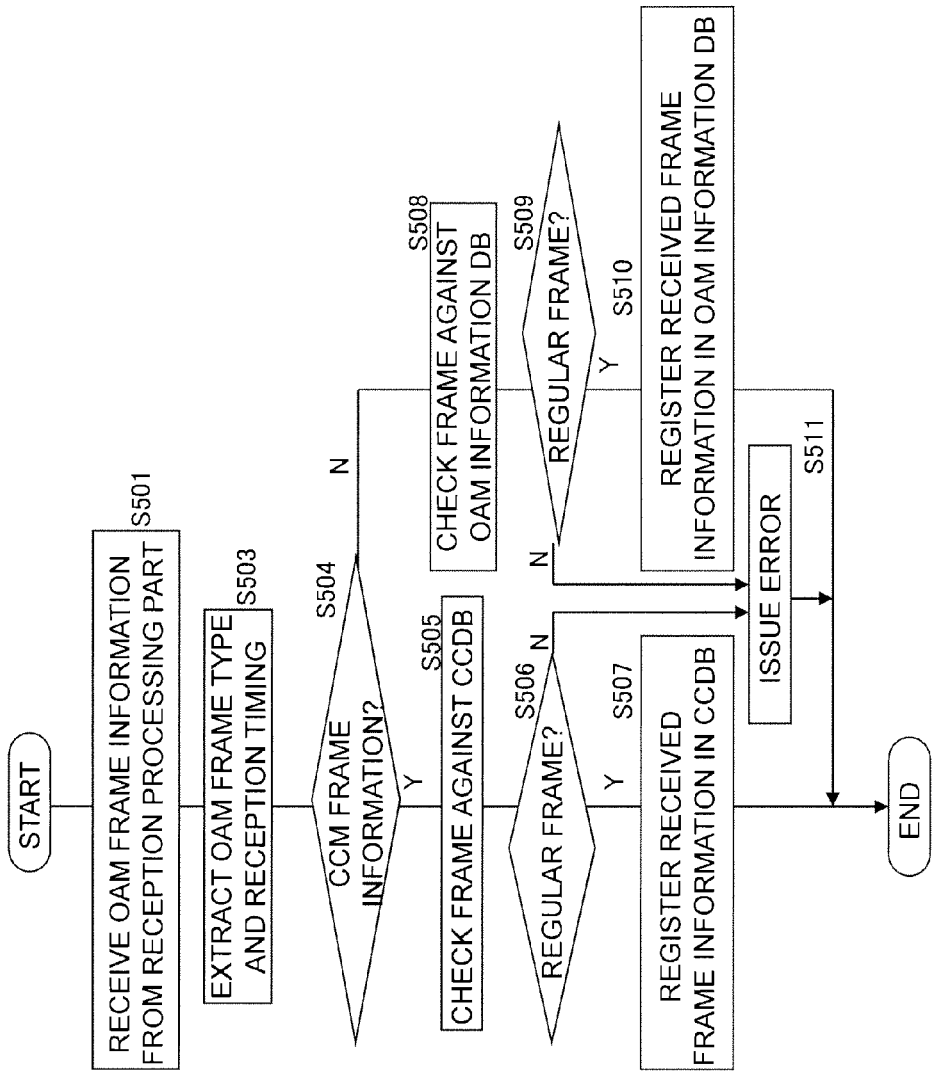
FIG. 16 is a flowchart illustrating OAM frame (processing including a failure notice frame) processing in an OAM control part of the OAM-capable NE.

FIG. 16 is a flowchart illustrating OAM frame (processing including the failure notice frame) processing in the OAM control part of the OAM-capable NE.

In this flowchart, the OAM control part 1291 starts the processing according to a given period, a trigger input from a manager or the like, or a trigger excited by OAM frame reception. The OAM control part 1291 monitors the received frame information reception state from the I/O processing part 1230 (S501), and confirms whether the OAM measurement frame is received, or not. If the OAM measurement frame is received, the OAM control part 1291 extracts the type of the OAM frame and the reception timing (S503), and confirms whether the frame is the CCM frame or the other OAM frame (S504). The failure notice frame is included in the other OAM frame.

If the received frame is the CCM frame, the OAM control part 1291 acquires the frame information, and thereafter confirms whether the acquired frame is a regular frame conforming to the setting of the redundant system, or not (S506). For example, in the case of the CCM frame, the OAM control part 1291 confirms whether a given time elapses from an expected time at which the frame is received, or not, according to the parameters described in the CCDB 1293 (S505). If the frame is received in an effective timing, the OAM control part 1291 extracts (acquires) information included in the frame, and confirms this information (S506). When the OAM control part 1291 receives the CCM frame different in the path setting status in Step S506, the OAM control part 1291 issues an error indicative of this fact (S511), and completes the processing. On the other hand, in the case of the regular CCM frame, the OAM control part 1291 stores the received information such as the path ID included in the frame and the reception time of the frame in the CCDB 1293 (S507).

Even if the received frame is the other OAM frame in Step S504, the OAM control part 1291 conducts the same processing with respect to checking of the frame against the database (S508), confirmation of whether the frame is regular, or not (S509), and the registration of the frame in the OAM DB (S510). If the failure notice frame is received, the OAM control part 1291 conducts the same processing as that when the OAM frame other than the CCM is received.

FIG. 17 illustrates a configuration example of the CCDB 1293 provided in the OAM-capable NE 200-Z.

The CCDB 1293 includes an expected CCM frame arrival time 1401 calculated according to the CCM frame transmission period setting, a time 1402 at which the CCM frame is really received, a lag 1403 of the CCM frame arrival time from the estimated time, and the other CCM frame information 1404. The other CCM frame information 1404 can include, for example, VLAN tag information and information for monitoring the path such as a maintenance entity group (MEG) level, an MEG ID, and an MEG end point (MEP) ID specified in Non Patent Literature 5.

In the table 1293, an upper limit number of entries is determined in implementation, and information is sequentially rewritten by a given number of entries. As a trigger for rewriting the information, two methods can be provided. In one method, when a new CCM frame is received, information is sequentially overwritten from specific entries. In the other method, a management timer is provided for each entry, and the entries are deleted at a time when the timer reaches a given count whereby information is written on a free entry at the time of receiving the new frame. This embodiment does not refer to the entry management. Basically, the entry management may be conducted by the aid of an aging process or the like as with the MAC address learning process versatilely used in the Ethernet network. In this embodiment, a difference in the detail system of the table handling is not essential, and therefore its description will be omitted. In this example, it is only necessary that the identification of the CCM frames and the management of the CCM frame information accompanied by this identification can be conducted.

If the CCM frame cannot be normally received according to schedule, or if some defect is found in the path information or the like stored in the CCM frame, this fact is recorded in a Flags 1405, and notified the OAM control part 1291 of.

Figure 18:
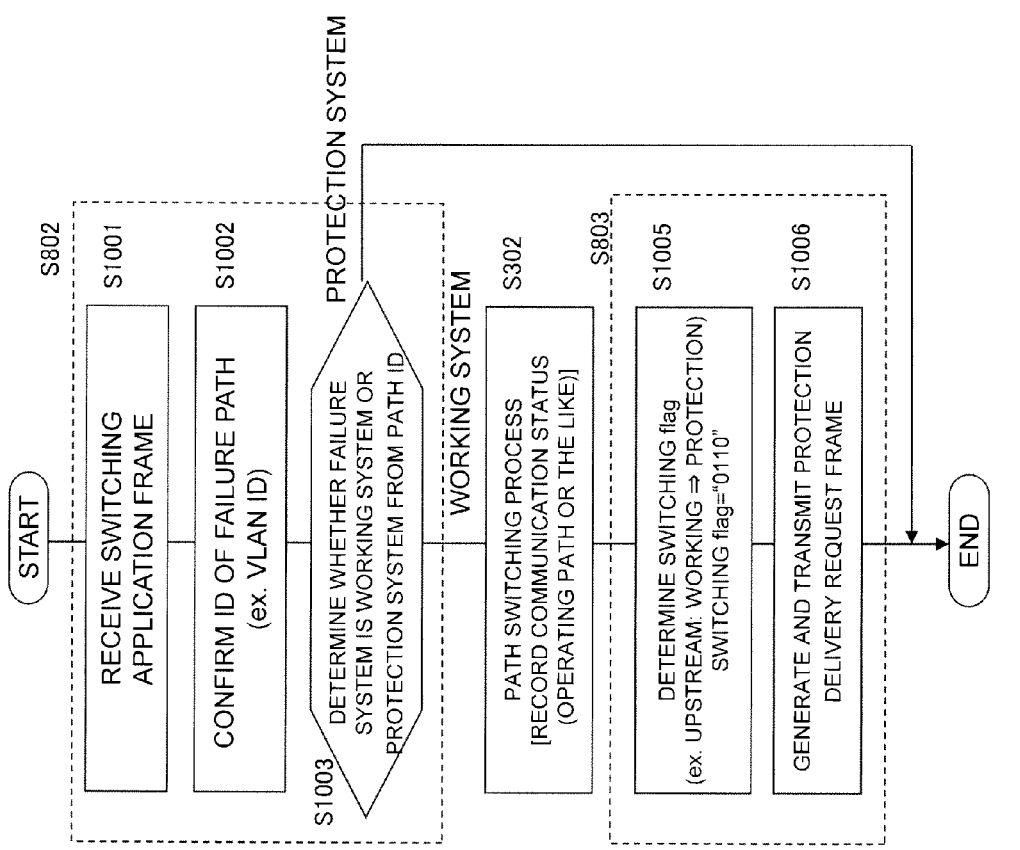
FIG. 18 is a flowchart illustrating an example of a specific procedure in a protection delivery request generation process S803 in a basic switching sequence of FIG. 3.

FIG. 18 is a flowchart illustrating an example of a specific procedure in a protection delivery request generation process S803 in the basic switching sequence of FIG. 3.

In the figure, how to set the path ID and a switching flag will be described with reference to an example in which the communication failure is detected in an upstream signal of the working path.

Upon receiving the path switching application 1501 from the OLT 210 configuring the working path (S1001), the OAM-capable NE 200-Z determines that the communication failure occurs in the path. The OAM-capable NE 200-Z extracts the path ID from the received switching application frame, and specifies a logical ID of the failure path (S1002). As described in FIG. 13, the ID can be, for example, a VLAN ID. When not a logical defect (setting error, and convergence due to path priority or the like) in a single path, but the same failures occur in all of the VLAN IDs accommodated in the OLT 210, it is conceivable that the failure of the physical line level occurs somewhere in all of the intervals including the PON interval.

Figure 19:
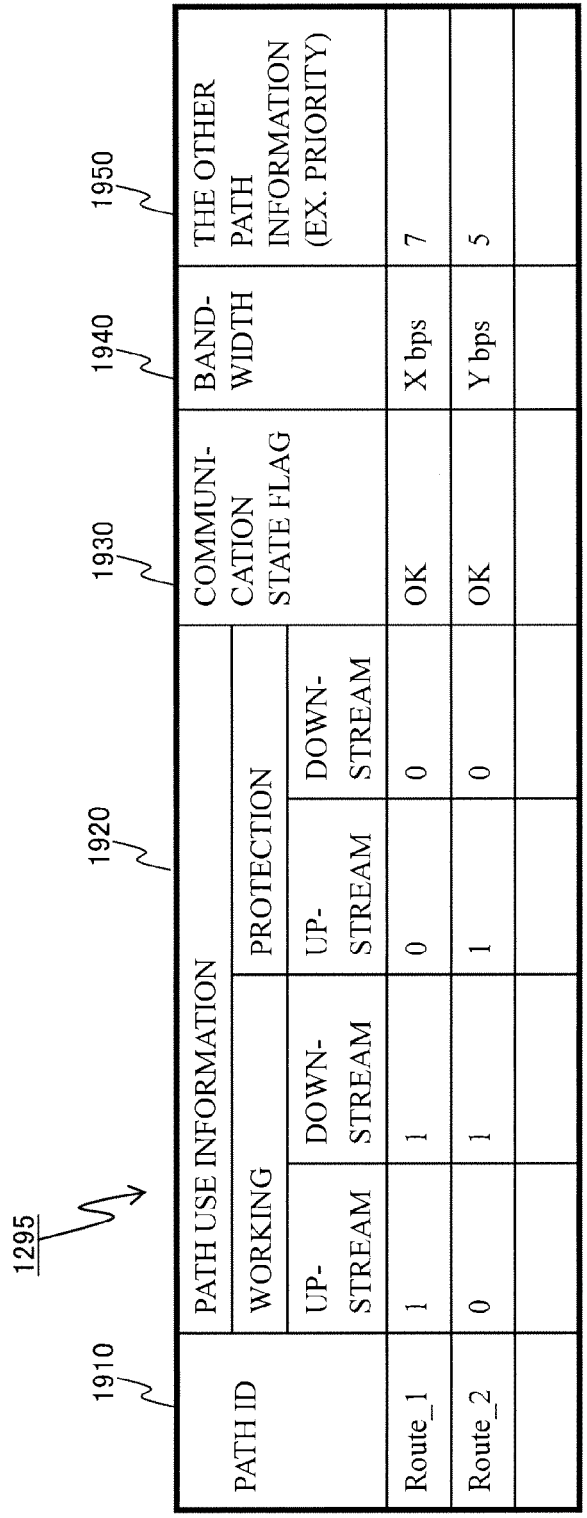
FIG. 19 is a configuration example of a path state management table held in the OAM-capable NE 200-Z.

Then, when the path is specified with reference to the path ID (VLAN ID) as described above, the OAM-capable NE 200-Z confirms the communication status in the path (S1003). The communication status represents path use information that the working path or the protection path is used in each of the upstream communication and the downstream communication for each path ID. That is, the OAM-capable NE 200-Z has a path identifier corresponding to the switching Flags 4220 illustrated in FIG. 4, and also includes a table having flags indicating the communication in each path is normal or abnormal (communication state management DB 1295) (refer to FIG. 19). FIG. 19 illustrates a procedure from a state where both of the working system and the protection system normally operate, and the OAM-capable NE 200-Z first detects the working failure. A series of processing from Steps S1001 to S1003 corresponds to the processing of S802 described in FIG. 3.

The OAM-capable NE 200-Z updates the table (communication state management DB 1295) indicative of the above communication status immediately after detecting the failure, and starts the path switching process (S302).

In this path switching process, in order to continue the communication of the path ID, a path use information 1920 indicative of the use path is specified. This method is illustrated in the figure. In brief, it is assumed that a flag of the failure detected path (including the communication direction) is set to "off", and a flag of the path used after switching is set to "on". For example, in this figure, the flag that is "1100" in a normal state is changed to "0110" whereby designation is made to use the protection system for the upstream communication, and the working system for the downstream communication. There is no need to always use the same path in two-way communications of upstream and downstream. For the proper management, if the use paths are switched in both of the two ways when the defect is detected in one way, the switching operation can be realized by setting the path use information 1920 to "0011" in this figure.

Subsequently, the OAM-capable NE 200-Z determines the switching Flags 1920 of FIG. 4 as with the updated path use information in the communication state management DB 1295 (S1005), generates a protection delivery request frame 321 that sets the path ID and the switching Flags 4220, and transmit the generated frame 321 (S1006). The processing from Steps S1005 to S1006 corresponds to the processing of S803 described in FIG. 3.

FIG. 19 is a configuration example of a communication state management database 1295 held in the OAM-capable NE 200-Z.

This table includes a path ID 1910, a path use information 1920, a communication state flag 1930, and the other path information 1940.

The path ID 1910 is an identifier for managing a flow of the user. Because the path ID indicates the user ID per se in this sense, the priority and a contracted bandwidth are different according to the contracts. Accordingly, the example in this figure includes priority as an other path information parameter 1950.

Also, the path use information 1920 is information on a communication status for indicating the combination of the paths used for the respective upstream and downstream communications in the corresponding path ID 1910. In this example, Route_1 uses the working system in both of the upstream and downstream communications, and Rout_2 uses the protection system in the upstream communication and the working system in the downstream communication.

Figure 20:
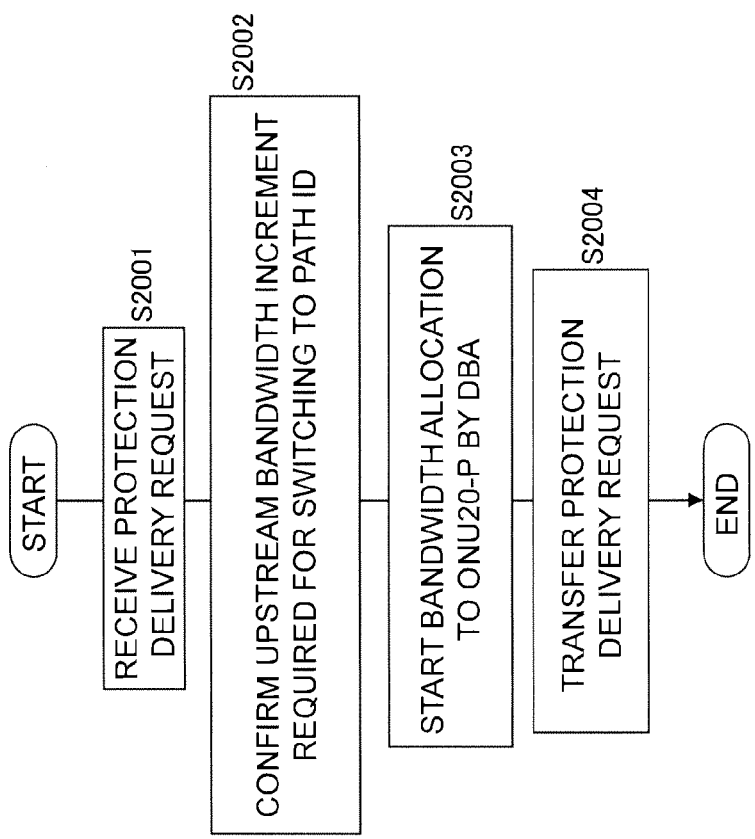
FIG. 20 is a flowchart illustrating the operation of an OLT 210-P that receives the protection delivery request frame of FIG. 4.

FIG. 20 is a flowchart illustrating the operation of the OLT 210-P that receives the protection delivery request frame of FIG. 4.

Upon receiving the protection delivery request (that is, delivery path switching notice) (S2001), the protection OLT 210-P confirms a communication bandwidth increment in the protection path, necessary for continuing the communication of the path ID (S2002). Notice of the required bandwidth amount can be given with the use of the protection delivery request frame 321. For example, in the configuration example of FIG. 4, the notice can be easily realized by using a part of the others field for giving notice of the required bandwidth amount. In the OAM-capable NE 200-Z that is a receiving end of the protection interval, because the communication bandwidth corresponding to the path ID is grasped by the communication state management database 1295, it is efficient to give notice of the necessary bandwidth to the OLT 210-P from the OAM-capable NE 200-Z simultaneously at the time of the protection delivery request.

The OLT 210-P allocates the bandwidth to the ONU 220-P after confirming the bandwidth amount (S2003). Because the upstream bandwidth is always transmitted according to a communication permission from the OLT 210 in the PON, the bandwidth allocation is implemented at the same time as the protection delivery request without waiting for a bandwidth request from the ONU 220-P in this figure. The bandwidth allocation may be implemented after waiting for the bandwidth request from the ONU 220-P. Also, because the protection delivery request frame 321 received from the OAM-capable NE 200-Z is notified the OAM-capable NE 200-A of at substantially the same time as the bandwidth allocation, the frame is transferred with the use of the downstream communication frame (S2004). Because Steps S2004 and S2003 are advanced at substantially the same time, the procedure may be conducted to previously implement Step S2003 according to the frame processing circumstances within the OLT 210-P.

The OAM-capable NE 200-A receiving the protection delivery request frame 321 changes the signal transmission interface toward the OAM-capable NE 200-Z from the interface 251-W to the interface 251-P in the switch 250-A, for the path ID designated by the protection delivery request frame 321.

Because the path ID to be switched is designated by the protection delivery request frames 321 and 322, the OAM-capable NE 200-A no longer transmits data of the path ID to the working path 2010-W when receiving the frames. Also, failure occurs in the communication in the working path identified by the path ID, and even if an instruction for switching is given to the OAM-capable NE 200-A through the working path OLT 210-P and the ONU 220-P, it is unclear whether the signal is normally transmitted, or not. Accordingly, it is only necessary to basically transmit the protection delivery request frame 321 to only the protection system. In principle, it is only necessary to give notice with the use of the path confirmed to be excellent in the communication status between the OAM-capable NEs 200-A and 200-Z. It is needless to say that there rises particularly no problem even if the frame is transmitted to both the paths.

As understood from the above description, in order to designate the upstream communication path by the protection delivery request frame described in FIG. 4, it is sufficient to indicate only a working path on/off 4221 and a protection path on/off 4223 for an upstream communication. Conversely, in the downstream communication, in order to instruct the use path from the OAM-capable NEs 200-A to 200-Z, it is only necessary to transmit the upstream frame including information 4222 and 4224 related to the downstream communication to the OAM-capable NE 200-Z. In FIG. 4, all of the combinations of the paths used in the upstream direction and the downstream direction are illustrated for association with FIG. 19 and facilitation of description.

6. Function Addition

In the above description, the method of managing the redundant path in the OAM-capable NEs 200-A and 200-Z located at both ends of the management interval of the packet network is described.

The above description is given of the method in which when a part of the redundant path is configured by the optical access system (PON), switching from the working path 2010-W to the protection path 2010-P when failure occurs in the PON interval is speeded up.

In order to use the switching application frame transmitted from the OLT 210-W to the OAM-capable NE 200-Z as a path switching trigger, the failure is determined by the OAM control part of the OLT 210 with reference to the transmission and reception intervals (timing) of the CCM frames in the PON interval in the above description.

As the trigger of failure determination in the OLT 210-W, a method using only the DBA function is also enabled. In the DBA, only the data transmission timing from the ONU 220 existing under the OLT 210-W is confirmed. Accordingly, although the contents of the upstream data frame in the PON interval are the OAM frame or the user data frame, it can be determined whether the communication in the PON interval is normal, or not, according to the determination of whether the reception timing is conducted under the DBA control, or not.

Therefore, as a second embodiment, it is conceivable that the switching application frame is transmitted to the OAM-capable NE 200-Z immediately when defect of the upstream frame reception timing is detected in the OLT 210-W. In the current advice, for example, as a method of correcting the communication defect in the PON interval, there is a method of adjusting the EqD setting or conducting re-ranging.

As an embodiment using this idea, there can be applied, for example, a method in which switching application frame transmission is triggered when the reception timing is shifted over a given value (the number of bits or time), a method in which the switching application frame transmission is triggered when the EqD re-adjusting process occurs at given or more frequency, a method in which the switching application frame transmission is triggered with opportunity of re-ranging, and a method in which the switching application frame transmission is triggered when re-ranging occurs at given or more frequency.

In the above setting, it is conceivable that implementation difference due to the requirement of the network providers is large. The basic operation is illustrated in FIG. 3. An essential portion of this embodiment resides in that when it is determined whether the switching application frame transmission is triggered, or not, in the OLT 210-W, the defect of the path is directly detected on the basis of only confirmation (that is, DBA operation status) of the received data timing.

When the first embodiment is applied, with selective extraction of the OAM frame, after it is surely confirmed that the operation is abnormal, the switching application frame is transmitted from the OLT 210-W to the OAM-capable NE 200-Z. For that reason, the detection can be speeded up while using the standardized frame format, and a useless (erroneous) switching application frame is prevented from flowing between both the devices. On the other hand, according to the second embodiment, a function addition for processing the Ethernet OAM to the OLT 210-W is not required, and when the communication defect is detected in the PON interval, a switching request can be notified the OAM-capable NE 200-Z of in fastest timing.

The invention claimed is:

1. A communication system, comprising:
 a first passive optical network including one or more first subscriber devices, and a first subscriber accommodating device that can connect the one or more subscriber devices in time division multiplexing;
 a second passive optical network including one or more second subscriber devices, and a second subscriber accommodating device that can connect the one or more second subscriber devices in time division multiplexing; and
 a first communication device and a second communication device which are connected by a first communication path on the first passive optical network and a second communication path on the second passive optical network, at least one of the first communication device and the second communication device has a function of selecting any one of the first and second communication paths to be used,
 wherein
 the first subscriber accommodating device stores operations, administrations and maintenance (OAM) information that predetermines reception intervals of monitoring frames for monitoring a path status, which are periodically transmitted from the first communication device at a transmitter side,
 during communication between the first communication device and the second communication device through the first communication path on the first passive optical network, the first subscriber accommodating device configuring a working path determines whether a frame received from one of the first subscriber devices is the monitoring frame, or not, and if the frame is the monitoring frame, the first subscriber accommodating device checks the monitoring frame against the OAM information, and confirms whether the monitoring frame can be received in regular timing, or not,
 if the first subscriber accommodating device can confirm that the monitoring frame is received in the regular timing, the first subscriber accommodating device transfers the frame to the second communication device that is a destination device,
 if the first subscriber accommodating device cannot confirm that the monitoring frame is received in the regular timing, the first subscriber accommodating device extracts path identification information configured by the first subscriber device that detects failure from the received frame, generates a path switching application frame including the path identification information and a flag indicative of the failure, and transfers the path switching application frame to the second communication device,
 and
 the second communication device includes a communication status management database storing path use information indicative of a communication path used for each of an upstream communication and a downstream communication for each path identification information,
 wherein,
 when the second communication device receives the path switching application frame from the first subscriber accommodating device that configures the working path, the second communication device determines that a failure occurs in the path, and extracts the path identification information from the received switching application frame,
 the second communication device records, in the communication state management database, the path use information in which the failure detected path specified by the path identification information is set to off, and the path to be used after switching is set to on,
 the second communication device generates a protection delivery request frame including the path identification information and the path use information, and transmits the protection delivery request frame to the second subscriber accommodating device,
 and
 wherein the second subscriber accommodating device transfers the protection delivery request frame received from the second communication device to the first communication device, and
 wherein, upon receiving the protection delivery request frame, the first communication device changes the communication path toward the second communication device from the first passive optical network to the second passive optical network.

2. The communication system according to claim 1, wherein,
 upon receiving the protection delivery request frame, the second subscriber accommodating device configuring the protection path confirms a communication bandwidth amount or a communication bandwidth increment in the protection path, necessary for continuing the communication of the path identification information, and
 after confirming the communication bandwidth amount or the communication increment, the second subscriber accommodating device allocates the bandwidth to the second subscriber devices connected to the first communication device.

3. The communication system according to claim 1,
 wherein the switching application frame includes the path identification information and an identifier indicative of a failure status including a failure level and/or an urgency level for each path.

4. A subscriber accommodation apparatus in a communication system, comprising:
 a first passive optical network including one or more first subscriber devices, and a first subscriber accommodating device that can connect the one or more subscriber devices in time division multiplexing;
 a second passive optical network including one or more second subscriber devices, and a second subscriber accommodating device that can connect the one or more second subscriber devices in time division multiplexing; and a first communication device and a second communication device which are connected by a first communication path on the first passive optical network and a second communication path on the second passive optical network, at least one of the first communication device and the second communication device has a function of selecting any one of the first and second communication paths to be used, wherein the first subscriber accommodating device stores operations, administrations and maintenance (OAM) information that predetermines reception intervals of monitoring frames for monitoring a path status, which are periodically transmitted from the first communication device at a transmitter side, during communication between the first communication device and the second communication device through the first communication path on the first passive optical network, the first subscriber accommodating device configuring a working path determines whether a frame received from one of the first subscriber devices is the monitoring frame, or not, and if the frame is the monitoring frame, the first subscriber accommodating device checks the monitoring frame against the OAM information, and confirms whether the monitoring frame can be received in regular timing, or not, if the first subscriber accommodating device can confirm that the monitoring frame is received in the regular timing, the first subscriber accommodating device transfers the frame to the second communication device that is a destination device, if the first subscriber accommodating device cannot confirm that the monitoring frame is received in the regular timing, the first subscriber accommodating device extracts path identification information configured by the first subscriber device that detects failure from the received frame, generates a path switching application frame including the path identification information and a flag indicative of the failure, and transfers the path switching application frame to the second communication device, and wherein, when the second communication device receives the path switching application frame from the first subscriber accommodating device that configures the working path, the second communication device determines that a failure occurs in the path, and execute path switching process to the second communication device.

5. A communication method using a communication system, comprising:

a first passive optical network including one or more first subscriber devices, and a first subscriber accommodating device that can connect the one or more subscriber devices in time division multiplexing;

a second passive optical network including one or more second subscriber devices, and a second subscriber accommodating device that can connect the one or more second subscriber devices in time division multiplexing; and a first communication device and a second communication device which are connected by a first communication path on the first passive optical network and a second communication path on the second passive optical network, at least one of the first communication device and the second communication device has a function of selecting any one of the first and second communication paths to be used, wherein the first subscriber accommodating device stores operations, administrations and maintenance (OAM) information that predetermines reception intervals of monitoring frames for monitoring a path status, which are periodically transmitted from the first communication device at a transmitter side, during communication between the first communication device and the second communication device through the first communication path on the first passive optical network, the first subscriber accommodating device configuring a working path determines whether a frame received from one of the first subscriber devices is the monitoring frame, or not, and if the frame is the monitoring frame, the first subscriber accommodating device checks the monitoring frame against the OAM information, and confirms whether the monitoring frame can be received in regular timing, or not, if the first subscriber accommodating device can confirm that the monitoring frame is received in the regular timing, the first subscriber accommodating device transfers the frame to the second communication device that is a destination device, if the first subscriber accommodating device cannot confirm that the monitoring frame is received in the regular timing, the first subscriber accommodating device extracts path identification information configured by the first subscriber device that detects failure from the received frame, generates a path switching application frame including the path identification information and a flag indicative of the failure, and transfers the path switching application frame to the second communication device, and the second communication device includes a communication status management database storing path use information indicative of a communication path used for each of an upstream communication and a downstream communication for each path identification information, wherein, when the second communication device receives the path switching application frame from the first subscriber accommodating device that configures the working path, the second communication device determines that a failure occurs in the path, and extracts the path identification information from the received switching application frame, the second communication device records, in the communication state management database, the path use information in which the failure detected path specified by the path identification information is set to off, and the path to be used after switching is set to on, the second communication device generates a protection delivery request frame including the path identification information and the path use information, and transmits the protection delivery request frame to the second subscriber accommodating device, and wherein the second subscriber accommodating device transfers the protection delivery request frame received from the second communication device to the first communication device, and wherein, upon receiving the protection delivery request frame, the first communication device changes the communication path toward the second communication device from the first passive optical network to the second passive optical network.

* * * * *